(12) United States Patent
Simon et al.

(10) Patent No.: US 11,146,437 B2
(45) Date of Patent: Oct. 12, 2021

(54) DYNAMIC CONFIGURATION OF A FLEXIBLE ORTHOGONAL FREQUENCY DIVISION MULTIPLEXING PHY TRANSPORT DATA FRAME

(71) Applicant: One Media, LLC, Hunt Valley, MD (US)

(72) Inventors: Michael J. Simon, Frederick, MD (US); Kevin A. Shelby, Austin, TX (US); Mark Earnshaw, Kanata (CA)

(73) Assignee: ONE MEDIA, LLC, Hunt Valley, MD (US)

( * ) Notice: Subject to any disclaimer, the term of this patent is extended or adjusted under 35 U.S.C. 154(b) by 0 days.

(21) Appl. No.: 16/795,850

(22) Filed: Feb. 20, 2020

(65) Prior Publication Data
US 2020/0252251 A1 Aug. 6, 2020

Related U.S. Application Data

(63) Continuation of application No. 16/269,698, filed on Feb. 7, 2019, now Pat. No. 10,574,500, which is a
(Continued)

(51) Int. Cl.
*H04L 27/26* (2006.01)
*H04L 5/00* (2006.01)
(Continued)

(52) U.S. Cl.
CPC ............ *H04L 27/265* (2013.01); *H04L 5/003* (2013.01); *H04L 5/0007* (2013.01);
(Continued)

(58) Field of Classification Search
CPC ....... H04B 3/23; H04B 3/32; H04L 25/03343; H04L 25/497; H04L 25/03057;
(Continued)

(56) References Cited

U.S. PATENT DOCUMENTS 6,961,388 B2   11/2005  Ling et al.
7,002,904 B2 *  2/2006  Jung .................. H04L 27/2614
                                                   370/208
(Continued)

FOREIGN PATENT DOCUMENTS

CN    101208887 A    6/2008
CN    101459491 A    6/2009
(Continued)

OTHER PUBLICATIONS

"Digital Video Broadcasting {DVB}" ETSI EN 302 755 v1.3.1; Apr. 2012; pp. 1-188; European Telecommunications Standards Institute (ETSI), France (188 pages).
(Continued)

*Primary Examiner* — James M Perez
(74) *Attorney, Agent, or Firm* — Sterne, Kessler, Goldstein & Fox P.L.L.C.

(57) ABSTRACT

A base station may generate and transmit a transport stream including a sequence of frames. A frame may include a plurality of partitions, where each partition includes a corresponding set of OFDM symbols. For each partition, the OFDM symbols in that partition may have a corresponding cyclic prefix size and a corresponding FFT size, allowing different partitions to be targeted for different collections of user devices, e.g., user devices having different expected values of maximum delay spread and/or different ranges of mobility. The base station may also dynamically re-configure the sample rate of each frame, allowing further resolution in control of subcarrier spacing. By allowing the cyclic prefixes of different OFDM symbols to have different lengths, it is feasible to construct a frame that confirms to a set payload duration and has arbitrary values of cyclic prefix size per partition and FFT size per partition. The partitions may be multiplexed in time and/or frequency.

20 Claims, 21 Drawing Sheets

Related U.S. Application Data continuation of application No. 15/809,832, filed on Nov. 10, 2017, now Pat. No. 10,205,619, which is a continuation of application No. 15/222,817, filed on Jul. 28, 2016, now Pat. No. 9,853,851, which is a continuation of application No. 14/821,107, filed on Aug. 7, 2015, now Pat. No. 9,866,421.

(60) Provisional application No. 62/034,583, filed on Aug. 7, 2014.

(51) Int. Cl.
*H04W 72/00* (2009.01)
*H04W 88/16* (2009.01)

(52) U.S. Cl.
CPC ...... *H04L 27/2602* (2013.01); *H04L 27/2607* (2013.01); *H04W 72/005* (2013.01); *H04W 88/16* (2013.01)

(58) Field of Classification Search
CPC ..... H04L 27/2601–2608; H04L 27/2626–263; H04L 27/265; H04L 27/2602; H04L 27/2607; H04L 5/0007; H04L 5/003; H04W 72/005; H04W 88/16
See application file for complete search history.

(56) References Cited

U.S. PATENT DOCUMENTS

| | | | |
|---|---|---|---|
| 7,020,072 B1 | 3/2006 | Li et al. | |
| 7,088,782 B2 | 8/2006 | Mody et al. | |
| 7,327,795 B2 | 2/2008 | Oprea | |
| 7,415,080 B2 * | 8/2008 | Echavarri | H04L 7/042 375/342 |
| 7,499,496 B2 | 3/2009 | Fujii et al. | |
| 7,756,002 B2 * | 7/2010 | Batra | H04L 1/0071 370/208 |
| 7,756,208 B2 * | 7/2010 | Bykovnikov | H04L 27/2626 375/260 |
| 7,830,921 B2 * | 11/2010 | Liebchen | G10L 19/0017 370/477 |
| 7,920,884 B2 | 4/2011 | Agrawal et al. | |
| 8,027,367 B2 | 9/2011 | Li et al. | |
| 8,144,571 B2 | 3/2012 | Lee et al. | |
| 8,351,319 B2 * | 1/2013 | Parkvall | H04L 5/0094 370/203 |
| 8,406,323 B2 | 3/2013 | Huang et al. | |
| 8,442,134 B2 | 5/2013 | Bury | |
| 8,577,299 B2 | 11/2013 | Agrawal et al. | |
| 8,654,696 B2 | 2/2014 | Fukuoka | |
| 8,738,001 B2 | 5/2014 | Fahldieck | |
| 8,761,303 B2 * | 6/2014 | Griot | H04L 27/2607 375/296 |
| 8,804,675 B2 | 8/2014 | Gutierrez et al. | |
| 8,873,651 B2 * | 10/2014 | Muhammad | H04L 27/367 375/260 |
| 8,942,336 B2 * | 1/2015 | Ghosh | H04L 27/0006 375/367 |
| 8,982,788 B2 * | 3/2015 | Han | H04L 27/2602 370/328 |
| 9,001,918 B2 * | 4/2015 | Taori | H04L 27/2646 375/284 |
| 9,036,567 B2 | 5/2015 | Krishnmoorthi et al. | |
| 9,037,093 B2 * | 5/2015 | Smith | H04W 56/0045 455/67.16 |
| 9,043,687 B2 | 5/2015 | Ko et al. | |
| 9,049,697 B2 | 6/2015 | Toshimitsu | |
| 9,179,440 B2 | 11/2015 | Gutierrez et al. | |
| 9,184,794 B1 * | 11/2015 | Ibrahim | H04L 27/2656 |
| 9,203,674 B2 * | 12/2015 | Kobayashi | H03G 3/3078 |
| 9,215,054 B2 * | 12/2015 | Han | H04J 11/0079 |
| 9,253,428 B2 | 2/2016 | Allison, III et al. | |
| 9,258,800 B2 | 2/2016 | Kwak et al. | |
| 9,300,327 B2 | 3/2016 | Ko et al. | |
| 9,307,273 B2 | 4/2016 | Yoo et al. | |
| 9,325,554 B2 * | 4/2016 | Yokokawa | H04L 25/0232 |
| 9,363,040 B2 | 6/2016 | Ko et al. | |
| 9,369,325 B2 | 6/2016 | Kim et al. | |
| 9,374,141 B2 * | 6/2016 | Murakami | H04B 7/0469 |
| 9,374,198 B2 | 6/2016 | Fong et al. | |
| 9,386,562 B2 | 7/2016 | Gutierrez et al. | |
| 9,425,836 B2 * | 8/2016 | Wang | H04W 4/18 |
| 9,425,880 B2 | 8/2016 | Kim et al. | |
| 9,438,459 B2 * | 9/2016 | Simon | H04L 5/0044 |
| 9,571,322 B2 * | 2/2017 | Bae | H04L 27/2627 |
| 9,692,630 B2 * | 6/2017 | Qi | H04L 1/007 |
| 9,698,962 B2 | 7/2017 | Rajagopalan | |
| 9,699,012 B2 * | 7/2017 | Mun | H04L 1/0071 |
| 9,853,851 B2 * | 12/2017 | Simon | H04L 27/265 |
| 9,866,421 B2 * | 1/2018 | Simon | H04L 5/0007 |
| 9,954,917 B2 * | 4/2018 | Park | H04L 1/0045 |
| 10,033,566 B2 * | 7/2018 | Simon | H04L 5/0094 |
| 10,205,619 B2 * | 2/2019 | Simon | H04L 27/2607 |
| 10,389,569 B2 * | 8/2019 | Simon | H04L 27/2602 |
| 10,560,299 B2 * | 2/2020 | Simon | H04L 5/0007 |
| 10,574,500 B2 | 2/2020 | Simon et al. | |
| 2002/0150126 A1 | 10/2002 | Kovacevic | |
| 2002/0155811 A1 | 10/2002 | Prismantas et al. | |
| 2003/0072255 A1 * | 4/2003 | Ma | H04L 7/0008 370/208 |
| 2003/0123383 A1 * | 7/2003 | Korobkov | H04L 5/0044 370/208 |
| 2004/0081131 A1 * | 4/2004 | Walton | H04L 5/0037 370/344 |
| 2004/0218519 A1 * | 11/2004 | Chiou | H04L 1/20 370/203 |
| 2005/0220002 A1 | 10/2005 | Li et al. | |
| 2005/0265488 A1 * | 12/2005 | Jung | H04L 27/2662 375/340 |
| 2005/0282571 A1 | 12/2005 | Oprescu-Surcobe et al. | |
| 2006/0002367 A1 | 1/2006 | Lee et al. | |
| 2006/0062317 A1 * | 3/2006 | Chang | H04L 27/266 375/260 |
| 2006/0072649 A1 | 4/2006 | Chang et al. | |
| 2007/0058595 A1 * | 3/2007 | Classon | H04L 1/188 370/337 |
| 2007/0242600 A1 * | 10/2007 | Li | H04W 72/042 370/210 |
| 2007/0280098 A1 * | 12/2007 | Bhatt | H04L 27/2662 370/208 |
| 2008/0037679 A1 * | 2/2008 | Khan | H04L 5/0046 375/267 |
| 2008/0084845 A1 * | 4/2008 | Kuchibhotla | H04B 7/2656 370/331 |
| 2008/0095195 A1 | 4/2008 | Ahmadi et al. | |
| 2008/0130485 A1 * | 6/2008 | Yang | H04L 5/0064 370/208 |
| 2008/0186843 A1 | 8/2008 | Ma et al. | |
| 2008/0222482 A1 * | 9/2008 | Ban | H04L 27/2607 714/752 |
| 2008/0287068 A1 * | 11/2008 | Etemad | H04L 5/001 455/68 |
| 2008/0298490 A1 * | 12/2008 | Yun | H04L 27/2618 375/260 |
| 2009/0028258 A1 | 1/2009 | Ma et al. | |
| 2009/0040970 A1 * | 2/2009 | Ahmadi | H04B 7/2612 370/329 |
| 2009/0080406 A1 * | 3/2009 | Gopal | H04B 7/022 370/350 |
| 2009/0082002 A1 * | 3/2009 | Kim | H04L 5/0091 455/418 |
| 2009/0110092 A1 * | 4/2009 | Taylor | H04L 27/2601 375/260 |
| 2009/0110094 A1 * | 4/2009 | Taylor | H04L 27/2608 375/260 |
| 2009/0215499 A1 * | 8/2009 | Moon | H04L 5/1469 455/566 |
| 2009/0219842 A1 * | 9/2009 | Moon | H04L 27/2602 370/294 |

(56) References Cited

U.S. PATENT DOCUMENTS

| | | | |
|---|---|---|---|
| 2009/0296645 A1* | 12/2009 | Bui | H04L 27/2627 370/329 |
| 2010/0027486 A1* | 2/2010 | Gorokhov | H04B 1/7075 370/329 |
| 2010/0085985 A1* | 4/2010 | Pekonen | H04L 1/0071 370/474 |
| 2010/0086087 A1* | 4/2010 | Pekonen | H04L 1/0072 375/346 |
| 2010/0098025 A1* | 4/2010 | Chen | H04W 36/0061 370/331 |
| 2010/0110874 A1* | 5/2010 | Kang | H04L 27/2602 370/208 |
| 2010/0111014 A1* | 5/2010 | Kang | H04W 72/1268 370/329 |
| 2010/0118806 A1* | 5/2010 | Griot | H04L 27/2607 370/329 |
| 2010/0149961 A1* | 6/2010 | Lee | H04L 27/2602 370/204 |
| 2010/0150056 A1 | 6/2010 | Iwai et al. | |
| 2010/0165914 A1 | 7/2010 | Cho et al. | |
| 2010/0189027 A1 | 7/2010 | Ishida et al. | |
| 2010/0202371 A1* | 8/2010 | Josiam | H04W 72/005 370/329 |
| 2010/0220666 A1* | 9/2010 | Imamura | H04W 74/002 370/329 |
| 2010/0226322 A1* | 9/2010 | Choi | H04B 7/0478 370/329 |
| 2010/0226426 A1* | 9/2010 | Tupala | H04L 1/0072 375/240.01 |
| 2010/0246726 A1* | 9/2010 | Asjadi | H04L 27/265 375/340 |
| 2010/0272034 A1* | 10/2010 | Imai | H04L 25/0204 370/329 |
| 2010/0278123 A1* | 11/2010 | Fong | H04L 5/0007 370/329 |
| 2010/0309384 A1* | 12/2010 | Asjadi | H04L 27/2656 348/725 |
| 2010/0310016 A1* | 12/2010 | Okehie | H04L 25/0232 375/340 |
| 2011/0002422 A1* | 1/2011 | Cheng | H04L 27/2659 375/343 |
| 2011/0013732 A1* | 1/2011 | Atungsiri | H04L 27/2662 375/343 |
| 2011/0044406 A1* | 2/2011 | Insenser Farre | H04L 5/0053 375/308 |
| 2011/0051634 A1* | 3/2011 | Lim | H04L 5/0092 370/281 |
| 2011/0051649 A1* | 3/2011 | Josiam | H04W 72/005 370/312 |
| 2011/0051688 A1* | 3/2011 | Lee | H04W 72/04 370/331 |
| 2011/0055887 A1* | 3/2011 | Vare | H04W 76/12 725/116 |
| 2011/0058527 A1* | 3/2011 | Choi | H04L 5/0044 370/329 |
| 2011/0069790 A1* | 3/2011 | Okehie | H04L 25/022 375/340 |
| 2011/0085507 A1* | 4/2011 | Jongren | H04B 7/0697 370/329 |
| 2011/0211541 A1* | 9/2011 | Yuk | H04L 25/03834 370/329 |
| 2011/0261677 A1* | 10/2011 | Kim | H04L 5/003 370/210 |
| 2011/0299493 A1* | 12/2011 | Gutierrez | H04L 5/0046 370/329 |
| 2012/0033589 A1* | 2/2012 | Zheng | H04W 99/00 370/280 |
| 2012/0050547 A1* | 3/2012 | Gaddam | H04L 27/2675 348/192 |
| 2012/0076127 A1* | 3/2012 | Mourad | H04H 20/426 370/345 |
| 2012/0093080 A1* | 4/2012 | Lee | H04W 74/02 370/328 |
| 2012/0134440 A1* | 5/2012 | Yun | H04L 27/2602 375/295 |
| 2012/0140836 A1* | 6/2012 | Helard | H04L 27/2618 375/260 |
| 2012/0151547 A1* | 6/2012 | Mourad | H04H 20/426 725/116 |
| 2012/0170506 A1 | 7/2012 | Chun et al. | |
| 2012/0183107 A1 | 7/2012 | Zhu et al. | |
| 2012/0188878 A1* | 7/2012 | Simon | H04W 4/06 370/241 |
| 2012/0224472 A1* | 9/2012 | Kim | H04W 24/04 370/226 |
| 2012/0324523 A1* | 12/2012 | Stadelmeier | H04L 27/2602 725/118 |
| 2012/0327955 A1* | 12/2012 | Herrmann | H04N 21/2389 370/476 |
| 2013/0170409 A1* | 7/2013 | Ihm | H04B 7/2615 370/294 |
| 2013/0223457 A1* | 8/2013 | Pande | H04B 3/542 370/474 |
| 2013/0243116 A1* | 9/2013 | Ko | H04H 20/71 375/295 |
| 2013/0279614 A1 | 10/2013 | Walton et al. | |
| 2013/0291046 A1* | 10/2013 | Ko | H04L 5/0044 725/116 |
| 2013/0294364 A1 | 11/2013 | Jul | |
| 2013/0315203 A1 | 11/2013 | McGowan et al. | |
| 2014/0056206 A1 | 2/2014 | Higuchi et al. | |
| 2014/0092800 A1 | 4/2014 | Cho et al. | |
| 2014/0112274 A1 | 4/2014 | Moon et al. | |
| 2014/0150014 A1* | 5/2014 | Aitken | H04N 21/64322 725/33 |
| 2014/0169502 A1* | 6/2014 | Lovell | H04L 7/0079 375/324 |
| 2014/0198875 A1* | 7/2014 | Kim | H04L 5/0007 375/295 |
| 2014/0211775 A1* | 7/2014 | Sampath | H04L 27/2607 370/338 |
| 2014/0294124 A1* | 10/2014 | Atungsiri | H04L 1/007 375/340 |
| 2015/0006586 A1 | 1/2015 | Mourad et al. | |
| 2015/0036765 A1* | 2/2015 | Yun | H04L 27/263 375/296 |
| 2015/0043491 A1* | 2/2015 | Eng | H04W 16/14 370/329 |
| 2015/0049642 A1 | 2/2015 | Eng et al. | |
| 2015/0049712 A1 | 2/2015 | Chen et al. | |
| 2015/0055727 A1 | 2/2015 | Kim et al. | |
| 2015/0058908 A1* | 2/2015 | Ko | H04N 21/23424 725/116 |
| 2015/0078292 A1* | 3/2015 | Walker | H04W 72/005 370/329 |
| 2015/0085735 A1* | 3/2015 | Shelby | H04L 65/4076 370/312 |
| 2015/0181281 A1 | 6/2015 | Ko et al. | |
| 2015/0195067 A1 | 7/2015 | Kim et al. | |
| 2015/0215008 A1 | 7/2015 | Cho et al. | |
| 2015/0236884 A1 | 8/2015 | Suh et al. | |
| 2015/0256308 A1 | 9/2015 | Ma et al. | |
| 2015/0270889 A1 | 9/2015 | Shoshan et al. | |
| 2015/0304070 A1 | 10/2015 | Baek et al. | |
| 2015/0358106 A1 | 12/2015 | Limberg et al. | |
| 2016/0006593 A1* | 1/2016 | Asjadi | H04L 27/2611 375/295 |
| 2016/0036613 A1* | 2/2016 | Mun | H04L 27/2646 714/776 |
| 2016/0043830 A1* | 2/2016 | Simon | H04L 27/265 375/295 |
| 2016/0043890 A1* | 2/2016 | Simon | H04L 5/0044 375/260 |
| 2016/0050097 A1* | 2/2016 | Atungsiri | H04L 27/2602 375/295 |
| 2016/0057504 A1 | 2/2016 | Shelby et al. | |
| 2016/0065337 A1* | 3/2016 | Atungsiri | H04L 27/2663 375/260 |

(56) References Cited

U.S. PATENT DOCUMENTS

| | | | |
|---|---|---|---|
| 2016/0066123 A1 | 3/2016 | Ko et al. | |
| 2016/0087706 A1* | 3/2016 | Guey | H04L 5/005 |
| | | | 375/267 |
| 2016/0094970 A1 | 3/2016 | Oh et al. | |
| 2016/0105223 A1 | 4/2016 | Baek et al. | |
| 2016/0119908 A1 | 4/2016 | Kwak et al. | |
| 2016/0142237 A1* | 5/2016 | Atungsiri | H04L 27/2649 |
| | | | 375/260 |
| 2016/0164541 A1 | 6/2016 | Ko et al. | |
| 2016/0164637 A1 | 6/2016 | Suh et al. | |
| 2016/0165273 A1 | 6/2016 | Moon et al. | |
| 2016/0165274 A1 | 6/2016 | Moon et al. | |
| 2016/0173312 A1 | 6/2016 | Moon et al. | |
| 2016/0191288 A1 | 6/2016 | Baek et al. | |
| 2016/0198217 A1 | 7/2016 | Ko et al. | |
| 2016/0219331 A1* | 7/2016 | Stewart | H04N 21/4436 |
| 2016/0241358 A1 | 8/2016 | Ko et al. | |
| 2016/0241365 A1 | 8/2016 | Bae et al. | |
| 2016/0353439 A1* | 12/2016 | Simon | H04L 5/0094 |
| 2016/0373286 A1* | 12/2016 | Simon | H04L 5/0094 |
| 2017/0026221 A1* | 1/2017 | Atungsiri | H04L 27/2608 |
| 2017/0054581 A1* | 2/2017 | Simon | H04L 27/2607 |
| 2017/0094664 A1* | 3/2017 | Lee | H04B 7/0452 |
| 2017/0111141 A1* | 4/2017 | Ko | H04L 27/2613 |
| 2017/0163394 A1 | 6/2017 | Choi et al. | |
| 2017/0201395 A1* | 7/2017 | Jia | H04L 25/0222 |
| 2017/0207873 A1* | 7/2017 | Shelby | H04L 5/0048 |
| 2017/0207942 A1* | 7/2017 | Mun | H04L 12/18 |
| 2017/0207945 A1* | 7/2017 | Shelby | H04J 13/0062 |
| 2017/0237591 A1* | 8/2017 | Atungsiri | H04L 27/2602 |
| | | | 375/260 |
| 2017/0303163 A1* | 10/2017 | Sharma | H04W 28/04 |
| 2017/0338994 A1* | 11/2017 | Atungsiri | H04L 1/0071 |
| 2017/0339453 A1* | 11/2017 | Kwon | H04N 21/64322 |
| 2018/0077471 A1* | 3/2018 | Takahashi | H04N 21/8547 |
| 2018/0131550 A1* | 5/2018 | Simon | H04L 27/2607 |
| 2018/0205509 A1* | 7/2018 | Atungsiri | H04W 72/042 |
| 2018/0309610 A1* | 10/2018 | Simon | H04L 12/189 |
| 2019/0158331 A1* | 5/2019 | Pawar | H04W 72/0446 |
| 2019/0268195 A1* | 8/2019 | Simon | H04L 5/003 |
| 2020/0244504 A1* | 7/2020 | Simon | H04L 5/0007 |
| 2020/0252251 A1* | 8/2020 | Simon | H04L 27/265 |

FOREIGN PATENT DOCUMENTS

| | | |
|---|---|---|
| CN | 105007145 A | 10/2015 |
| CN | 105007146 A | 10/2015 |
| CN | 105024791 A | 11/2015 |
| CN | 105024952 A | 11/2015 |
| CN | 105024963 A | 11/2015 |
| CN | 105245479 A | 1/2016 |
| CN | 105282076 A | 1/2016 |
| CN | 105282078 A | 1/2016 |
| CN | 105323048 A | 2/2016 |
| CN | 105743624 A | 7/2016 |
| CN | 105991266 A | 10/2016 |
| CN | 105991495 A | 10/2016 |
| CN | 105991498 A | 10/2016 |
| CN | 105991500 A | 10/2016 |
| CN | 105991501 A | 10/2016 |
| CN | 105991502 A | 10/2016 |
| EP | 2 151 945 A2 | 2/2010 |
| EP | 2 393 227 A2 | 12/2011 |
| JP | H09-135230 A | 5/1997 |
| JP | H10-22973 A | 1/1998 |
| JP | 2007-531418 A | 11/2007 |
| JP | 2010-522500 A | 10/2008 |
| JP | 2008-288782 A | 11/2008 |
| JP | 2010-041687 A | 2/2010 |
| JP | 2010-183577 A | 8/2010 |
| JP | 2012-503923 T | 2/2012 |
| JP | 2013-509784 A | 3/2013 |
| JP | 2013-510467 A | 3/2013 |
| JP | 2013-102466 A | 5/2013 |
| JP | 2013-219778 A | 10/2013 |
| JP | 2010-252178 A | 11/2020 |
| WO | WO 2006/004594 A2 | 1/2006 |
| WO | WO 2007/098482 A2 | 11/2008 |
| WO | WO 2008/155915 A1 | 12/2008 |
| WO | WO 2009/000185 A1 | 12/2008 |
| WO | WO 2009/133742 | 11/2009 |
| WO | WO 2014/065568 | 10/2012 |

OTHER PUBLICATIONS

Chu, C.W. et al., "Design of An OFDMA Baseband Receiver for 3GPP Long-Term Evolution," IEEE International Symposium on VLSI Design, Automation and Test, Piscataway, NJ, USA, pp. 196-199 (Apr. 23, 2008).

Earnshaw, M. et al., "Physical Layer Framing for ATSC 3.0," IEEE Transactions on Broadcasting, vol. 62, No. 1, Piscataway, NJ, USA, pp. 263-270 (Mar. 1, 2016).

DVB Organization: "TM-NGH496_Doppler_2.pptx", DVB, Digital Video Broadcasting, C/0 EBU-17A Ancienne Route-CH-1218 Grand Saconnex, Geneva—Switzerland, Oct. 25, 2010 (Oct. 25, 2010), XP017832536.

"Digital Video Broadcasting (DVB); Implementation guidelines for a second generation digital terrestrial television broadcasting system (DVBT2)", Technical Specification, European Telecommunications Standards Instituie (ETSI), 650, Route Des Lucioles ; F-06921 Sophia-Antipolis ; France, vol. BROADCAS, No. V1.1.1, Oct. 1, 2010 (Oct. 1, 2010 ), XP014061392.

"A flexible approach for 802.16m compatibility with legacy 802.16 systems; C80216m-08_1159r1", IEEE Draft; C80216M-08_1159R1, IEEE-SA, Piscataway, NJ USA, vol. 802.16m, Sep. 5, 2008 (Sep. 5, 2008), pp. 1-8, XP017611088, [retrieved on Sep. 17, 2008].

"Flexible OFDM parameters for better performance; C80216m-08_1158", IEEE Draft; C80216M-08_1158, IEEE-SA, Piscataway, NJ USA, vol. 802.16m, Sep. 5, 2008 (Sep. 5, 2008), pp. 1-7, XP017610974, [retrieved on Sep. 6, 2008].

International Search Report and Written Opinion; International Application No. PCT/US2015/44290; dated Oct. 26, 2015.

English-language abstract for Chinese patent publication No. CN 105007145 A, published Oct. 28, 2015, 1 page, from https://worldwide.espacenet.com.

English-language abstract for Chinese patent publication No. CN 105007146 A, published Oct. 28, 2015, 1 page, from https://worldwide.espacenet.com.

English-language abstract for Chinese patent publication No. CN 105024791 A, published Nov. 4, 2015, 1 page, from https://worldwide.espacenet.com.

English-language abstract for Chinese patent publication No. CN 105024952 A, published Nov. 4, 2015, 2 pages, from https://worldwide.espacenet.com.

English-language abstract for Chinese patent publication No. CN 105024963 A, published Nov. 4, 2015, 1 page, from https://worldwide.espacenet.com.

English-language abstract for Chinese patent publication No. CN 105245479 A, published Jan. 13, 2016, 1 page, from https://worldwide.espacenet.com.

English-language abstract for Chinese patent publication No. CN 105282076 A, published Jan. 27, 2016, 2 pages, from https://worldwide.espacenet.com.

English-language abstract for Chinese patent publication No. CN 105282078 A, published Jan. 27, 2016, 1 page, from https://worldwide.espacenet.com.

English-language abstract for Chinese patent publication No. CN 105323048 A, published Feb. 10, 2016, 1 page, from https://worldwide.espacenet.com.

English-language abstract for Chinese patent publication No. CN 105743624 A, published Jul. 6, 2016, 2 pages, from https://worldwide.espacenet.com.

English translation for Chinese patent publication No. CN 105007145 A, published Oct. 28, 2015, 17 pages, translated by Google at https://patents.google.com.

(56) References Cited

OTHER PUBLICATIONS

English translation for Chinese patent publication No. CN 105007146 A, published Oct. 28, 2015, 17 pages, translated by Google at https://patents.google.com.
English translation for Chinese patent publication No. CN 105024791 A, published Nov. 4, 2015, 14 pages, translated by Google at https://patents.google.com.
English translation for Chinese patent publication No. CN 105024952 A, published Nov. 4, 2015, 20 pages, translated by Google at https://patents.google.com.
English translation for Chinese patent publication No. CN 105024963 A, published Nov. 4, 2015, 23 pages, translated by Google at https://patents.google.com.
English translation for Chinese patent publication No. CN 105245479 A, published Jan. 13, 2016, 28 pages, translated by Google at https://patents.google.com.
English translation for Chinese patent publication No. CN 105282076 A, published Jan. 27, 2016, 21 pages, translated by Google at https://patents.google.com.
English translation for Chinese patent publication No. CN 105282078 A, published Jan. 27, 2016, 24 pages, translated by Google at https://patents.google.com.
English translation for Chinese patent publication No. CN 105323048 A, published Feb. 10, 2016, 26 pages, translated by Google at https://patents.google.com.
English translation for Chinese patent publication No. CN 105743624 A, published Jul. 6, 2016, 38 pages, translated by Google at https://patents.google.com.
English translation for Chinese patent publication No. CN 105991266 A, published Oct. 5, 2016, 29 pages, translated by Google at https://patents.google.com.
English translation for Chinese patent publication No. CN 105991495 A, published Oct. 5, 2016, 21 pages, translated by Google at https://patents.google.com.
English translation for Chinese patent publication No. CN 105991498 A, published Oct. 5, 2016, 56 pages, translated by Google at https://patents.google.com.
English translation for Chinese patent publication No. CN 105991500 A, published Oct. 5, 2016, 40 pages, translated by Google at https://patents.google.com.
English translation for Chinese patent publication No. CN 105991501 A, published Oct. 5, 2016, 44 pages, translated by Google at https://patents.google.com.
English translation for Chinese patent publication No. CN 105991502 A, published Oct. 5, 2016, 25 pages, translated by Google at https://patents.google.com.
English translation for Japanese patent publication No. JP 2013-102466 A, published May 23, 2013, 13 pages, translated by Google at https://patents.google.com.
English translation for Japanese patent publication No. JP 2013-219778 A, published Oct. 24, 2013, 25 pages, translated by Google at https://patents.google.com.
English translation for Japanese patent publication No. JP 2013-510467 A, published May 23, 2013, 11 pages, translated by Google at https://patents.google.com.
Non-Final Office Action, dated Jan. 20, 2016, for U.S. Appl. No. 14/805,004, filed Jul. 21, 2015, entitled "Multi-Partition Radio Frames".
Notice of Allowance, dated May 10, 2016, for U.S. Appl. No. 14/805,004, filed Jul. 21, 2015, entitled "Multi-Partition Radio Frames".
Non-Final Office Action, dated Nov. 2, 2017, for U.S. Appl. No. 15/231,339, filed Aug. 8, 2016, entitled "Multi-Partition Radio Frames".
Final Office Action, dated May 31, 2018, for U.S. Appl. No. 15/231,339, filed Aug. 8, 2016, entitled "Multi-Partition Radio Frames".
Non-Final Office Action, dated Apr. 14, 2017, for U.S. Appl. No. 15/247,198, filed Aug. 25, 2016, entitled "Multi-Partition Radio Transmissions".
Notice of Allowance, dated Nov. 20, 2017, for U.S. Appl. No. 15/247,198, filed Aug. 25, 2016, entitled "Multi-Partition Radio Transmissions".
Notice of Allowance, dated Mar. 26, 2018, for U.S. Appl. No. 15/247,198, filed Aug. 25, 2016, entitled "Multi-Partition Radio Transmissions".
Communication pursuant to Rule 164(1) EPC, dated Mar. 21, 2018, for European Patent Appl. No. 15829279.7, 14 pages.
Extended European Search Report, dated Jun. 6, 2018, for European Patent Appl. No. 15829279.7, 17 pages.
English Translation of First Official Action, dated Apr. 17, 2018, for Chinese Patent Appl. No. 201580050598.8, 3 pages.
Search Report, dated Mar. 20, 2018, for for Chinese Patent Appl. No. 201580050598.8, 2 pages.
English translation for Chinese patent publication No. CN 101208887 A, published Jun. 25, 2008, 14 pages, translated by Google at https://patents.google.com.
English translation for Chinese patent publication No. CN 101459491 A, published Jun. 17, 2009, 7 pages, translated by Google at https://patents.google.com.
Office Action, dated Jun. 20, 2019, from Japanese Patent Appl. No. 2018-004080, 7 pages (with translation).
Jerry Pi, et al., Multiple CPs for 16m downlink OFDM frame structure, IEEE C802.16m-08/644, IEEE Internet <URL:http://www.ieee802.org/16/tgm/docs/C80216m-08_644.pdf>, Jul. 7, 2008.
Notice of Preliminary Rejection, dated May 20, 2019, for Korean Patent Appl. No. 10-2018-7001423, 10 pages (with translation).
English translation for Japanese patent publication No. JP 2010-041687 A, published Feb. 18, 2010, 9 pages, translated by Google at https://patents.google.com.
English translation for Japanese patent publication No. JP 2012-503923 A, published Feb. 9, 2012, 10 pages, translated by Google at https://patents.google.com.
Search Report, dated Feb. 22, 2019, from Japanese Patent Appl. No. 2017-502627, 45 pages (with translation).
English translation for Japanese patent publication No. JP 2010-183577 A, published Aug. 19, 2010, 22 pages, translated by Google at https://patents.google.com.

* cited by examiner

DYNAMIC CONFIGURATION OF A FLEXIBLE ORTHOGONAL FREQUENCY DIVISION MULTIPLEXING PHY TRANSPORT DATA FRAME

CROSS-REFERENCE TO RELATED APPLICATIONS

This application is a continuation of U.S. patent application Ser. No. 16/269,698, filed Feb. 7, 2019, now allowed, which is a continuation of U.S. patent application Ser. No. 15/809,832, filed Nov. 10, 2017, now U.S. Pat. No. 10,205,619, which is a continuation of U.S. patent application Ser. No. 15/222,817, filed Jul. 28, 2016, now U.S. Pat. No. 9,853,851, which is a continuation of U.S. patent application Ser. No. 14/821,107, filed Aug. 7, 2015, now U.S. Pat. No. 9,866,421, and claims priority under 35 U.S.C. 119(e) from U.S. Provisional Patent Application No. 62/034,583 filed on Aug. 7, 2014, which all are incorporated by reference herein in their entireties.

FIELD OF THE DISCLOSURE

The present disclosure relates to the field of wireless communication, and more particularly, to mechanisms for dynamically constructing Orthogonal Frequency Division Multiplexing ("OFDM") physical transport frames, to enable flexibility in configuration of transmissions in broadcast networks.

DESCRIPTION OF THE RELATED ART

In today's world, many electronic devices rely upon wireless connectivity for the reception of data from other connected devices. In a typical wireless deployment, there may be one or more wireless access points that transmit data, and one or more devices that receive data from the wireless access point(s).

In such a scenario, different devices may have different propagation channel characteristics, and these may affect their wireless data reception from the same wireless access point. For example, a device that is near the wireless access point and/or that has a fixed location (or is slowly moving) may have better propagation channel conditions than would a device that is moving at a high velocity and/or that is further away from the wireless access point. The first device may fall into a group of devices that can receive data encoded and transmitted with one set of parameters (such as a high Forward Error Correction (FEC) code rate, a high modulation level, and/or a smaller subcarrier spacing in an Orthogonal Frequency Division Multiplexing (hereinafter referred to as "OFDM") system, while the second device may fall into a group of devices that need data to be encoded and transmitted with a second set of parameters (such as a low FEC code rate, a low modulation level, and/or a wider subcarrier spacing in an OFDM system).

There are many scenarios where a large number of devices may all wish to receive identical data from a common source. One such example is broadcast television, where a large number of television sets in various homes all receive a common broadcast signal conveying a program of interest. In such scenarios, it is significantly more efficient to broadcast or multicast the data to such devices rather than individually signaling the same data to each device. However, programs with different quality levels (e.g. high definition video, standard definition video, etc.) may need to be transmitted to different groups of devices with different propagation channel characteristics. In other scenarios, it may be desirable to transmit device-specific data to a particular device, and the parameters used to encode and transmit that data may depend upon the device's location and/or propagation channel conditions.

As described above, different sets of transmitted data may need to be transmitted with different encoding and transmission parameters, either simultaneously or in a time-multiplexed fashion (or both). The amount of data to be transmitted in a particular data set and/or the encoding and transmission parameters for that data set may vary with time.

At the same time, the demand for high-speed wireless data continues to increase, and it is desirable to make the most efficient use possible of the available wireless resources (such as a certain portion of the wireless spectrum) on a potentially time-varying basis.

SUMMARY

Modern and future high-speed wireless networks must be designed for efficient handling of a variety of deployment scenarios. Presently disclosed are mechanisms that enable broad flexibility in wireless data delivery, to support services in a full range of deployment scenarios, which might include, but are not limited, to the following: receiver mobility (e.g. fixed, nomadic, mobile); cell size (e.g. macro, micro, pico); single or multiple frequency networks (SFN or MFN); multiplexing of different services; and bandwidth sharing.

A. In one set of embodiments, a method for constructing and transmitting a frame having a specified temporal length may be implemented as follows. The method may enable flexibility in configuring transmissions from a base station.

The method may include performing operations using digital circuitry of the base station, wherein said operations include: (a) for each of one or more partitions of the frame, determining a corresponding OFDM symbol length for OFDM symbols belonging to the partition, wherein the OFDM symbol length is based on a corresponding FFT size and a corresponding cyclic prefix size, wherein the corresponding cyclic prefix size satisfies a size constraint based on a corresponding minimum guard interval duration; (b) computing a sum of OFDM symbol lengths in a union of the OFDM symbols over the partitions; (c) computing a number of excess samples based on the sum and a length of a payload region of the frame; and (d) constructing the frame.

The action of constructing the frame may include, for each OFDM symbol in the union, assigning the OFDM symbol to exactly one of at least one subset of the union using at least one of the number of excess samples and an index of the OFDM symbol, and adding a number to the cyclic prefix size of each OFDM symbol in each of the at least one subset of the union, prior to embedding the OFDM symbols in the frame, wherein a unique number is used for each of the at least one subset of the union.

The method may also include transmitting the frame over a wireless channel using a transmitter of the base station.

In some embodiments, the action of constructing the frame also includes, for one of the at least one subset of the union, setting the unique number for that subset to zero.

In some embodiments, one of the at least one subset of the union represents an initial contiguous subset of the OFDM symbols in the union.

In some embodiments, the at least one subset of the union and the unique number for each of the at least one subset of the union are determined according to an algorithm known to remote devices that receive said transmissions.

B. In one set of embodiments, a method for constructing and transmitting a frame by a base station may be implemented as follows.

The method may include performing operations using digital circuitry of the base station, where the operations include constructing a payload region of the frame. The payload region includes a plurality of partitions, wherein each of the partitions includes a corresponding plurality of OFDM symbols, wherein each partition has a corresponding FFT size and a corresponding cyclic prefix size for OFDM symbols in that partition.

The method may also involve transmitting the frame over a wireless channel using a transmitter of the base station.

In some embodiments, the operations also include embedding signaling information in a non-payload region of the frame, wherein the signaling information indicates the FFT size and the cyclic prefix size for each of the partitions.

In some embodiments, each of the partitions includes a corresponding set of overhead resource elements (such as reference symbols). In these embodiments, the operations may also include scheduling symbol data from one or more service data streams to each of the partitions after having reserved the overhead resource elements within the frame.

In some embodiments, a first of the partitions is targeted for transmission to mobile devices, and, a second of the partitions is targeted for transmission to fixed devices. In these embodiments, the FFT size corresponding to the first partition may be smaller than the FFT size corresponding to the second partition.

In some embodiments, a first of the partitions is targeted for transmission to first user devices that are expected to have large delay spreads, and a second of the partitions is targeted for transmission to second user devices that are expected to have smaller delay spreads. In these embodiments, the cyclic prefix size for the first partition may be larger than the cyclic prefix size for the second partition.

In some embodiments, the frame may be partitioned according to one or more others factors in addition to (or, as an alternative to) the above-described partitioning according to the expected user mobility and required cell coverage as determined by FFT size and cyclic prefix size. For example, factors may include a data rate, wherein different partitions have different data rates. In particular, different partitions may have a high data rate or a low data rate (along the lines of Internet of Things), with a lower duty cycle for low power reception. In one example, factors may include tight vs. loose clustering where time diversity is sacrificed in the interest of allowing a low power device to wake up, consume the data it needs, and then go back to sleep. In one example, factors may include frequency partitioning that allows the band edges to be coded more robustly using a lower modulation order to permit band shaping or other interference mitigation techniques.

C. In one set of embodiments, a method for constructing and transmitting a frame by a base station may be implemented as follows.

The method may include performing operations using digital circuitry of the base station, where the operations include: (a) constructing a plurality of partitions, wherein each of the partitions includes a corresponding set of OFDM symbols, wherein the OFDM symbols in each partition conform to a corresponding FFT size and satisfy a corresponding minimum guard interval; and (b) constructing a frame by time interleaving the OFDM symbols of the partitions to form OFDM symbol clusters, wherein the OFDM symbol clusters are defined by: a specified value of OFDM symbol cluster size for each partition; and a specified value of OFDM symbol cluster period for each partition.

The method may also include transmitting the frame over a wireless channel using a transmitter of the base station.

In some embodiments, a first of the partitions is targeted for transmission to mobile devices, and a second of the partitions is targeted for transmission to fixed devices. In these embodiments, the FFT size corresponding to the first partition may be smaller than the FFT size corresponding to the second partition.

In some embodiments, the above-described operations may also include embedding signaling information in the frame, wherein the signaling information indicates the specified value of OFDM symbol cluster size for each partition and the specified value of OFDM symbol cluster period for each partition.

In some embodiments, a user device may be configured to: (1) receive the frame; (2) for a particular partition to which the user device has been assigned, determine the corresponding specified values of OFDM symbol cluster size and OFDM symbol cluster period based on the signaling information in the frame; and (3) recover the OFDM symbols belonging to OFDM symbol clusters of the particular partition, using the corresponding specified values.

D. In one set of embodiments, a method for constructing and transmitting a transport stream by a base station may be implemented as follows. The transport stream includes a frame.

The method may involve performing operations using digital circuitry of the base station, where the operations include: (a) constructing a payload region of the frame, wherein samples in the payload region correspond to a specified sample rate, wherein the specified sample rate is selected from a universe of possible sample rates supported by transmission circuitry of the base station, wherein the samples in the payload regions are divided into one or more partitions, wherein each of the partitions includes a corresponding set of OFDM symbols; and embedding signaling information in the transport stream, wherein the signaling information includes information indicating the specified sample rate.

The method may also include transmitting the transport stream over a wireless channel using a transmitter of the base station.

In some embodiments, the specified sample rate has been specified by an operator of a broadcast network that includes said base station.

In some embodiments, the above-described signaling information is embedded in a non-payload region of the frame. In an alternative embodiment, the signaling information may be embedded in a previous frame of the transport stream.

In some embodiments, each partition has a corresponding value of FFT size for OFDM symbols included in that partition.

In some embodiments, for each partition, the FFT size of that partition and the user-specified sampling rate have been selected to define a subcarrier spacing for that partition that satisfies a specified minimum subcarrier spacing (or Doppler tolerance) for that partition.

BRIEF DESCRIPTION OF THE DRAWINGS

A better understanding of the present invention can be obtained when the following detailed description of the preferred embodiments is considered in conjunction with the following drawings.

Figure 1A:
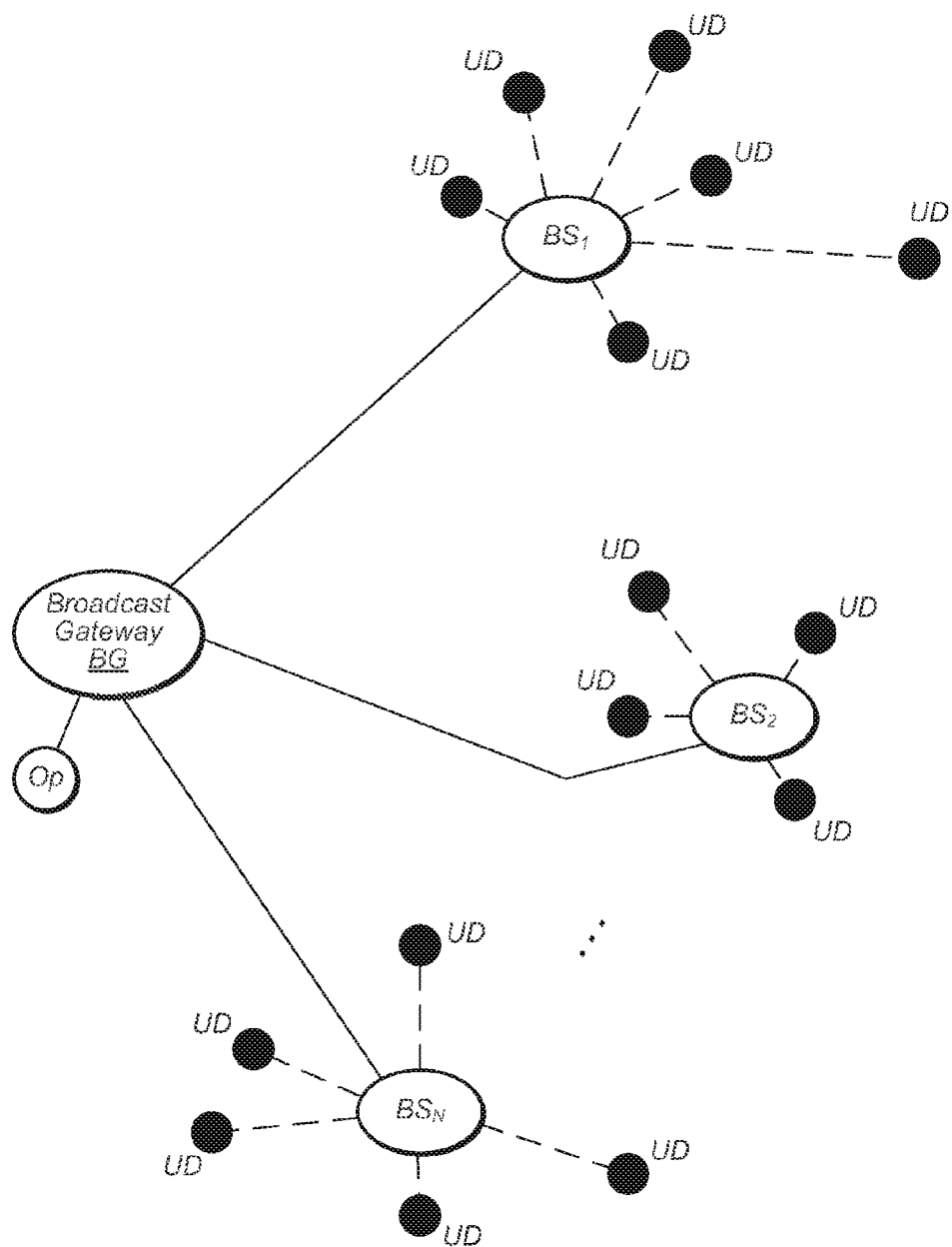
FIG. 1A illustrates one embodiment of a broadcast network including a plurality of base stations.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

List of Acronyms Used in the Present Patent

ATS: Auxiliary Termination Symbols
BG: Broadcast Gateway
BS: Base Station
CP: Cyclic Prefix
CRC: Cyclic Redundancy Check
DC: Direct Current
FEC: Forward Error Correction
FFT: Fast Fourier Transform
IFFT: Inverse Fast Fourier Transform
LDPC: Low Density Parity Check
MAC: Medium Access Control
MFN: Multi-Frequency Network
MHz: Mega Hertz
OFDM: Orthogonal Frequency Division Multiplexing
PDU: Protocol Data Unit
PHY PHYsical layer
PFDCH: Physical Frame Data CHannel
PPDCH: Physical Partition Data CHannel
PSDCH: Physical Service Data CHannel
QAM: Quadrature Amplitude Modulation
RS: Reference Symbols
SFN: Single Frequency Network
Broadcast Network Architecture In one set of embodiments, a broadcast network 100 may be configured as shown in FIG. 1A. The broadcast network 100 may include a plurality of base stations 101a, 101b ... 101n, illustratively suggested by base stations $BS_1$, $BS_2$, ..., $BS_N$ (hereinafter referred to as base stations 101). A broadcast gateway ("BG") 102 may couple to the base stations 101 through any of a variety of communication media. For example, in one embodiment, the broadcast gateway 102 may couple to the base stations 101 via the Internet, or more generally, via a computer network. Each base station 101 wirelessly transmits information to one or more user devices 103. (Each user device UD is denoted by a solid block circle.) Some of the user devices 103 may be fixed devices such as televisions and desktop computers. Other ones of the user devices 103 may be nomadic devices such as tablet computers or laptop computers. Other ones of the user devices 103 may be mobile devices such as mobile phones, automobile-based devices, aircraft-based devices, etc.

An operator ("Op") 104 of the broadcast network 100 may access the broadcast gateway 102 (e.g., via the Internet), and provide network configuration or operating instructions to the gateway 102. For example, the operator 104 may provide information such as one or more of the following items: an expected distribution of user device mobility for one or more of the base stations; the cell size of one or more of the base stations; a selection of whether the broadcast network or a subset of the network is to be operated as a single frequency network (SFN) or a multi-frequency network (MFN); a specification of how different services (e.g., television content streams) are to be assigned to different types of user devices; and identification of portions of bandwidth the broadcast network will not be using over corresponding periods of time.

The broadcast gateway may determine transmission control information for one or more base stations of the broadcast network based on the network configuration or operating instructions. For a given base station, the broadcast gateway may determine: transmission sample rate; number of partitions; sizes of the partitions; FFT size and cyclic prefix size for each partition. The broadcast gateway may send the transmission control information to the base stations so the base stations may construct and transmit frames according to the transmission control information. In other embodiments, the gateway may itself generate frames to be transmitted by each gateway and send the frames to the base stations. In yet other embodiments, the gateway may generate low level instructions (e.g., physical layer instructions) for the construction of frames to the base stations, and send those instructions to the base stations, which may simply generate frames based on the instructions.

OFDM Symbols and FFT/IFFT Sizes

An Orthogonal Frequency Division Multiplexing (OFDM) system uses an Inverse Fast Fourier Transform ("IFFT") operation at the transmitter to convert frequency domain data to the time domain for transmission, and a Fast Fourier Transform ("FFT") operation at the receiver to convert received time domain values back to the frequency domain in order to recover the originally transmitted data. In the following text, the term FFT is generally used, but the parameters described correspond to the frequency and time dimensions for both the FFT and IFFT operations.

For illustration purposes, an example base sampling rate of $F_S=12.288$ MHz is generally used here. This is not meant to be limiting, and other sampling rates may also be used. The corresponding base time unit corresponding to one sample is $T_S=1/F_S$ seconds.

A range of different FFT/IFFT sizes and cyclic prefix lengths may be supported in order to address a wide variety of propagation conditions and different end user scenarios. A separate entity such as a scheduler may select appropriate FFT/IFFT size(s) and cyclic prefix length(s) for each frame using the following guidelines.

First, the minimum subcarrier spacing needed to support the intended user mobility is determined. Higher mobile velocities result in larger Doppler shifts, which necessitate wider subcarrier spacing in frequency, Δf. The subcarrier spacing can be calculated as follows. This implies that larger FFT sizes would be used for fixed scenarios, and smaller FFT sizes would be used for mobile scenarios.

equ. (1)

$$\Delta f = \frac{F_s}{FFT \text{ size}}$$

Figure 1B:
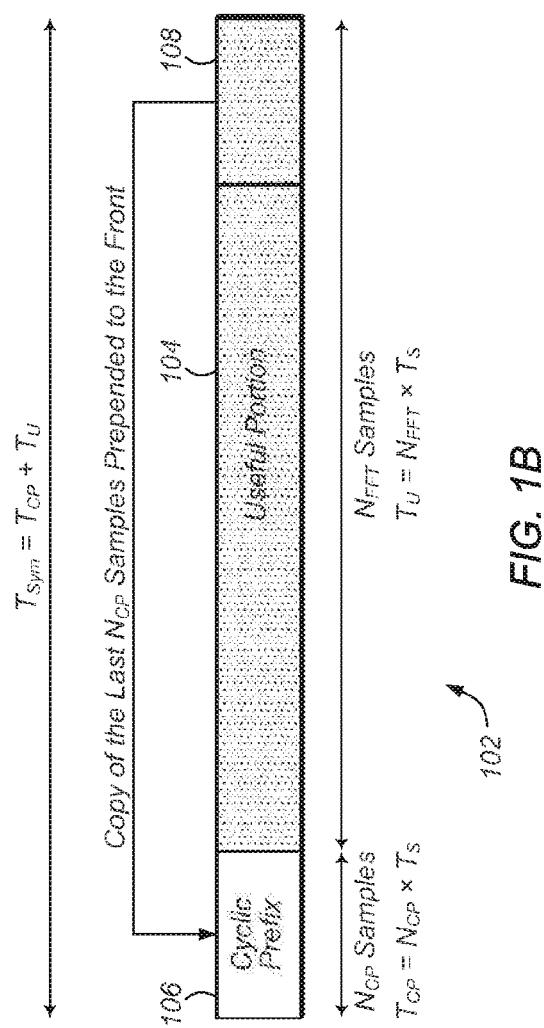
FIG. 1B illustrates one embodiment of an Orthogonal Frequency Division Multiplexing ("OFDM") symbol with both a cyclic prefix and a useful portion.

Each OFDM symbol with a total time length of $T_{Sym}$ consists of two parts, a cyclic prefix with a time length of $T_{CP}$, and a useful portion with a time length of $T_U$, as shown in the example OFDM symbol 102 illustrated in FIG. 1B. The useful portion 104 of the OFDM symbol 102 refers to the amount of data corresponding to that which is required for the IFFT/FFT operations. The cyclic prefix 106 is just a copy of the last $N_{CP}$ samples 108 of the useful portion 104 of the OFDM symbol, and thus essentially represents overhead which is included in the OFDM symbol 102.

The useful portion 104 of an OFDM symbol 102 has a number of time samples equal to the size of the FFT ($N_{FFT}$), and a time length equal to:

equ. (2)

$$T_U = FFT \text{ size} \times T_S = \frac{1}{\Delta f}$$

The cyclic prefix 106 contains a specified number of samples ($N_{CP}$) with a corresponding time length of $T_{CP}$. The cyclic prefix 106 consists of sample values copied from the end of the useful portion of the same OFDM symbol 102 and provides protection against inter-symbol interference between successive OFDM symbols 102.

The number of subcarriers actually used within an FFT/IFFT depends on both the subcarrier spacing (which is a function of the FFT size and the sampling frequency) and the bandwidth of the system, since the bandwidth occupied by the used subcarriers must be less than the system bandwidth (in order to allow for a guard band between adjacent channels). Note also that the direct current (DC) carrier is never used.

Table 1 shows a list of possible FFT sizes that can be used. FFT sizes that are an integer power of 2 may be preferred in a wireless implementation for simplification reasons. The time length ($T_U$) corresponding to the usable portion of each OFDM symbol 102, the subcarrier spacing ($\Delta f$), and the maximum Doppler velocity that can be handled at an example carrier frequency of 700 MHz are also shown. Here, the maximum Doppler velocity is defined as the receiver velocity which results in a Doppler frequency shift equal to 10% of the subcarrier spacing. (It should be understood that the 10% used here is not essential to the presently disclosed inventions. Indeed, the percentage may take any value in a range of values.) The values in this table are based on the assumed example sampling frequency of 12.288 MHz.

TABLE 1

Example FFT sizes, useful portion time lengths, subcarrier spacings, and maximum Doppler velocities for an example sampling rate of 12.288 MHz

| FFT Size ($N_{FFT}$) | $T_U$ (μs) | Δf (Hz) | Maximum Doppler velocity at 700 MHz (km/h) |
|---|---|---|---|
| 1024 | 83 | 12000 | 1851 |
| 2048 | 167 | 6000 | 926 |
| 4096 | 333 | 3000 | 463 |
| 8192 | 667 | 1500 | 231 |
| 16384 | 1333 | 750 | 116 |
| 32768 | 2667 | 375 | 58 |
| 65536 | 5333 | 188 | 29 |

Table 2 shows the same information for a different example sampling rate of 18.432 MHz. As can be seen, for a given FFT size, a sampling rate of 18.432 MHz results in a shorter OFDM symbol length ($T_U$), a wider subcarrier spacing (Δf), and a higher maximum Doppler velocity which can be handled, as compared to a sampling rate of 12.288 MHz.

TABLE 2

Example FFT sizes, useful portion time lengths, subcarrier spacings, and maximum Doppler velocities for an example sampling rate of 18.432 MHz

| FFT Size ($N_{FFT}$) | $T_U$ (µs) | $\Delta f$ (Hz) | Maximum Doppler velocity at 700 MHz (km/h) |
|---|---|---|---|
| 1024 | 56 | 18000 | 2777 |
| 2048 | 111 | 9000 | 1389 |
| 4096 | 222 | 4500 | 694 |
| 8192 | 444 | 2250 | 347 |
| 16384 | 889 | 1125 | 174 |
| 32768 | 1778 | 563 | 87 |
| 65536 | 3556 | 281 | 43 |

Cyclic Prefix Lengths and Cyclic Prefix Length Selection

Next, the cyclic prefix ("CP") length may be selected to meet the intended range requirement. The cyclic prefix is used to address inter-symbol interference between successive OFDM symbols. Such inter-symbol interference arises from copies of the transmitted signal with slightly different time delays arriving at the receiver, with such copies resulting from identical signal transmissions from multiple base stations in a Single Frequency Network ("SFN") and/or reflections of a transmitted signal in a multi-path propagation environment. Consequently, in an SFN with significant distances between neighboring base stations (or, potentially, in a propagation environment with significant multi-path scatter), a larger CP length would be selected. Conversely, in an SFN where neighboring base stations are closer together, a shorter CP length may be used.

The CP length may be viewed as a percent relative to the overall OFDM symbol length (giving the percent overhead consumed by the CP). However, for range planning, it is more useful to view the CP length as measured in samples (as defined by the 12.288 MHz example sampling frequency).

Radio signals will propagate approximately 24.4 meters in the tine of one sample for the example sampling frequency of 12.288 MHz.

Table 3 gives the cyclic prefix lengths (in number of samples) and corresponding ranges (in kin) for various example cyclic prefix lengths specified relative to (as a percentage of) the useful portion of each OFDM symbol. Again, the values in the table are based on the example sampling frequency of 12.288 MHz.

The above cyclic prefix lengths should be considered to be illustrative examples only. In particular, cyclic prefix lengths should not necessarily be considered to be restricted to be a power of two (or even a multiple of a power of two). Cyclic prefix lengths may have any positive integer value.

Payload Data Terminology

Figure 2:
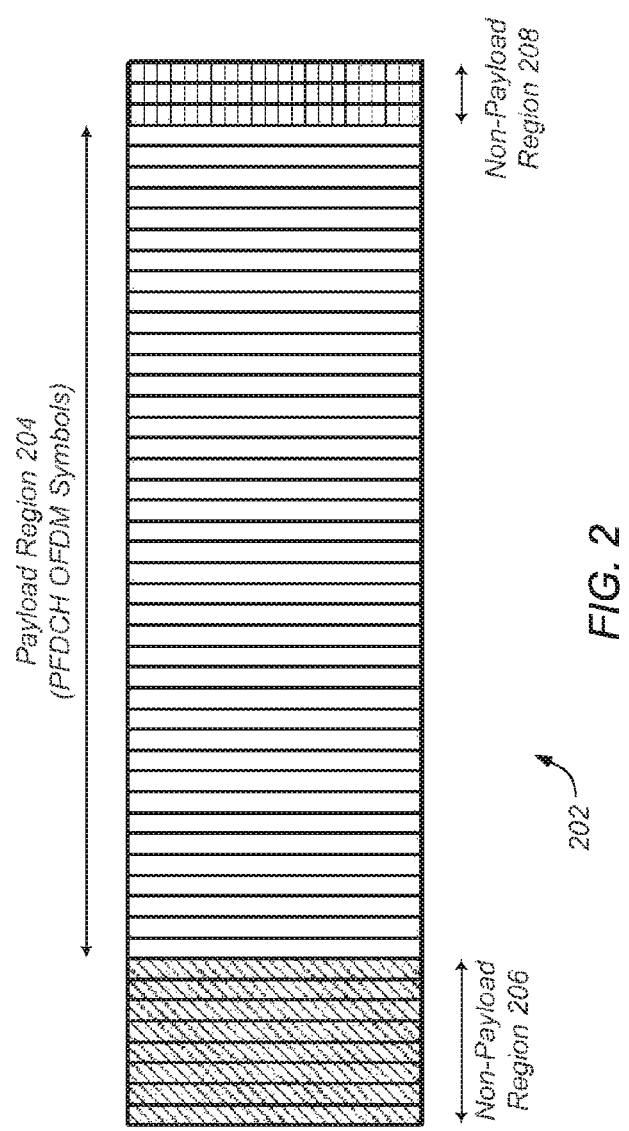
FIG. 2 illustrates an overview of an example frame structure.

In a wireless system, data may generally be transmitted in a series of frames, which represent a certain period of time. FIG. 2 shows an overview of the general frame structure. A frame 202 can be divided into a payload region 204 which carries actual payload data and zero or more non-payload regions 206 and 208 which may carry control or other signaling information. In the example of FIG. 2, separate non-payload regions 206 and 208 are shown by the shaded areas at the beginning and end of the frame 202. The relative lengths in time (horizontal axis) and numbers of symbols for each region are not shown to scale in this example diagram.

The payload section 204 of the frame may be referred to as the Physical Frame Data CHannel ("PFDCH") and carries the actual payload data (as opposed to control or other signaling data) being transmitted by a base station. For illustrative purposes, it can be assumed that each frame 202 has a time length of 1 second and that the payload region (PFDCH) 204 has a time length of 990 ms, but these example lengths are not meant to be limiting.

An OFDM wireless frame 202, particularly the payload portion 204, is divided into OFDM symbols in the time dimension and sub-carriers in the frequency dimension. The most basic (time-frequency) unit of data carrying capability in OFDM is a resource element, which is defined as one sub-carrier in the frequency dimension by one OFDM symbol in the time dimension. Each resource element can carry one QAM modulation symbol (or QAM constellation).

The number of sub-carriers available for a fixed system bandwidth depends on the subcarrier spacing, which is in turn dependent upon the selected FFT size and sampling frequency. The time length of an OFDM symbol is also dependent upon the selected FFT size and also upon the selected cyclic prefix length and sampling frequency. The number of OFDM symbols available within a fixed period of time (such as the length of a frame) is dependent upon the time lengths of the individual OFDM symbols contained within that period of time.

The PFDCH 204 may be divided into one or multiple partitions or Physical Partition Data Channel (hereinafter referred to as "PPDCHs"). A PPDCH is a rectangular logical area measuring some number of sub-carriers in the frequency dimension and some number of OFDM symbols within the time dimension. A PPDCH need not span the full frequency bandwidth of the system, or the full time length

TABLE 3

Example cyclic prefix lengths and corresponding ranges

| | Cyclic Prefix Length | | | | | | | | | | | | | |
|---|---|---|---|---|---|---|---|---|---|---|---|---|---|---|
| | 1.56% | | 2.34% | | 3.13% | | 4.69% | | 6.25% | | 9.38% | | 12.5% | |
| $N_{FFT}$ | # Samples | Range (km) | # Samples | Range (km) | # Samples | Range (km) | # Samples | Range (km) | # Samples | Range (km) | # Samples | Range (km) | # Samples | Range (km) |
| 1024 | 16 | 0.4 | 24 | 0.6 | 32 | 0.8 | 48 | 1.2 | 64 | 1.6 | 96 | 2.3 | 128 | 3.1 |
| 2048 | 32 | 0.8 | 48 | 1.2 | 64 | 1.6 | 96 | 2.3 | 128 | 3.1 | 192 | 4.7 | 256 | 6.3 |
| 4096 | 64 | 1.6 | 96 | 2.3 | 128 | 3.1 | 192 | 4.7 | 256 | 6.3 | 384 | 9.4 | 512 | 12.5 |
| 8192 | 128 | 3.1 | 192 | 4.7 | 256 | 6.3 | 384 | 9.4 | 512 | 12.5 | 768 | 18.8 | 1024 | 25.0 |
| 16384 | 255 | 6.3 | 384 | 9.4 | 512 | 12.5 | 768 | 18.8 | 1024 | 25.0 | 1536 | 37.5 | 2048 | 50.0 |
| 32768 | 512 | 12.5 | 768 | 18.8 | 1024 | 25.0 | 1536 | 37.5 | 2048 | 50.0 | 3072 | 75.0 | 4096 | 100.0 |
| 65536 | 1024 | 25.0 | 1536 | 37.5 | 2048 | 50.0 | 3072 | 75.0 | 4096 | 100.0 | 6144 | 150.0 | 8192 | 200.0 | of the PFDCH 204. This allows multiple PPDCHs to be multiplexed in time and/or frequency within the same PFDCH 204.

Different PPDCHs may have, but are not constrained to have, different FFT sizes and/or different cyclic prefix lengths. The primary intent behind dividing a PFDCH 204 into multiple PPDCHs is to support the provision of services to different categories of terminals. For example, fixed terminals may be served program data via a PPDCH with a large FFT size and closer subcarrier spacing, while mobile terminals may be served program data via a different PPDCH with a smaller FFT size and wider subcarrier spacing.

Figure 3A:
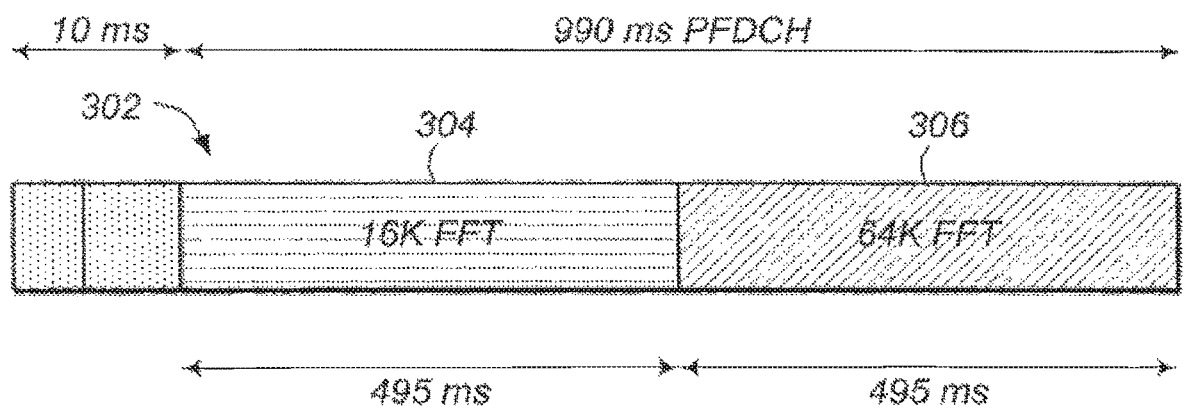
FIG. 3A illustrates an example of Physical Partition Data CHannel (PPDCH) time multiplexing with distinct time separation of the PPDCH.
Figure 3B:
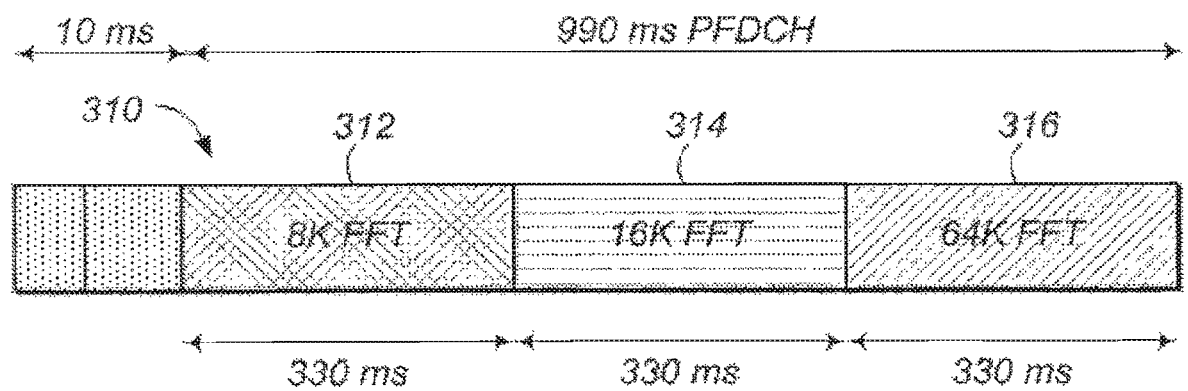
FIG. 3B illustrates an example Physical Partition Data CHannel (PPDCH) time multiplexing with distinct time separation of the PPDCH.

FIGS. 3A and 3B shows two examples of partitioned PFDCHs 302 and 310, respectively. These example configurations use the previously stated example frame length of 1 second and PFDCH length of 990 ms, which leave a 10 ms non-payload region at the beginning of each example frame. In the example illustrated in FIG. 3A, two PPDCHs 304 and 306 use different FFT sizes and may be intended to serve nomadic and fixed users, respectively. In the example illustrated in FIG. 3B, three PPDCHs 312, 314 and 316 use different FFT sizes and may be intended to serve mobile, nomadic, and fixed users, respectively. The same cyclic prefix length as measured in samples may be used for all of the PPDCHs if the desired transmit ranges for different categories of users are desired to be the same. However, there is no constraint requiring the same cyclic prefix length to be used across multiple PPDCHs, so the configured cyclic prefix length may vary from one PPDCH to another, and the use of different cyclic prefix lengths for different PPDCHs may in fact be desirable for certain wireless provisioning scenarios.

Figure 4A:
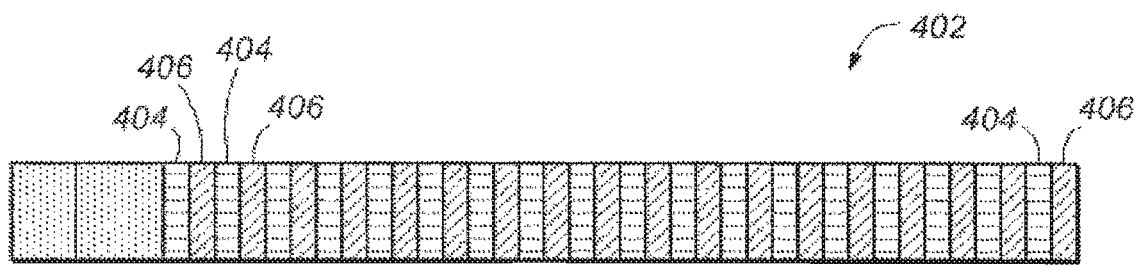
FIG. 4A illustrates an example of PPDCH time multiplexing with time interleaving of the PPDCH.
Figure 4B:
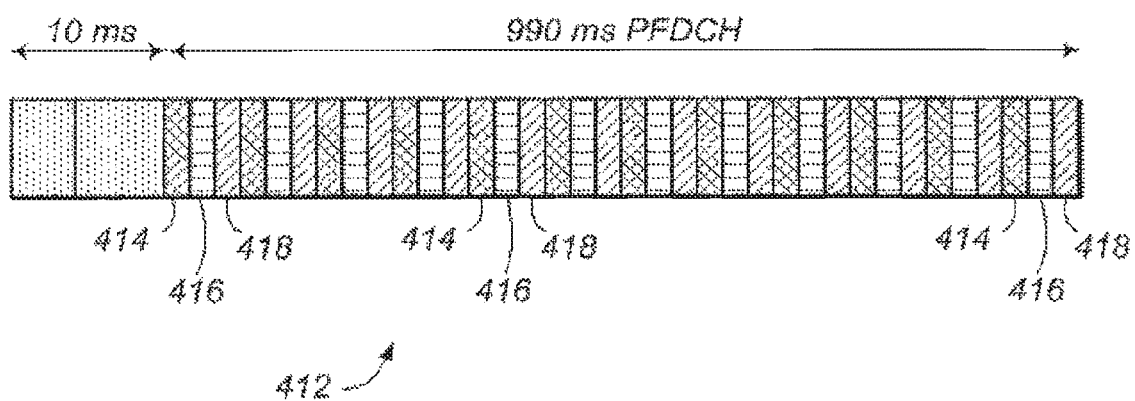
FIG. 4B illustrates an example of PPDCH time multiplexing with time interleaving of the PPDCH.

It should be appreciated that although FIG. 3 shows a strict time separation between the different PPDCHs when time multiplexing is used, OFDM symbols or OFDM symbol clusters from different PPDCHs can be time-interleaved with each other to maximize time diversity for a given frame configuration, as shown in FIGS. 4A and 4B. In FIG. 4A, a PFDCH 402 is partitioned in a time-interleaved fashion with OFDM symbol clusters 404 belonging to a first PPDCH, and OFDM symbol clusters 406 belonging to a second PPDCH. In FIG. 4B, a PFDCH 412 is partitioned in a time-interleaved fashion with OFDM symbol clusters 414 belonging to a first PPDCH, OFDM symbol clusters 416 belonging to a second PPDCH, and OFDM symbol clusters 418 belonging to a third PPDCH.

There are advantages to each of the above approaches. With a strict time separation such as in FIGS. 3A and 3B, a receiving terminal only needs to activate its radio for a portion of each frame, which can lead to reduced power consumption. With time interleaving such as shown in FIGS. 4A and 4B, greater time diversity can be achieved.

Although the PPDCHs in FIGS. 3A and 3B and FIGS. 4A and 4B are the same size, there is no requirement for PPDCHs within the same frame to be of the same length. Indeed, since different modulation levels and code rates are likely to be used within different PPDCHs, the data carrying capacities of different PPDCHs may also be very different.

Each PPDCH within a frame may contain zero or more Physical Service Data CHannels (hereinafter referred to as "PSDCH"). It should be appreciated that part or all of the physical resources within a PPDCH may be left unused. The contents of a PSDCH are encoded and transmitted using a specified set of physical resources within the corresponding PPDCH. Each PSDCH contains exactly one transport block for data carrying purposes. A transport block may correspond to a Medium Access Control ("MAC") Protocol Data Unit ("PDU") and represents a set of data bytes from upper layers to be transmitted.

Figure 5:
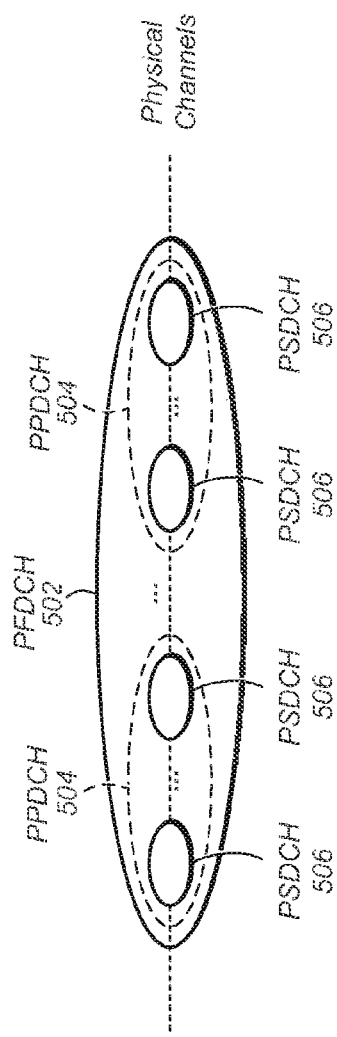
FIG. 5 illustrates the relationship between different physical channels for carrying payload data, according to one embodiment.

The relationship between the various payload-related physical channels is illustrated in FIG. 5. Each frame contains one PFDCH 502. The PFDCH 502 contains one or more PPDCHs 504. Each PPDCH 504 contains zero or more PSDCHs 506.

Variable Sampling Rate on a Per Frame Basis

Although an example sampling rate of 12.288 MHz has generally been used here for illustrative purposes, it has already previously been stated that this is not meant to be limiting and other sampling rates may also be used.

Figure 6:
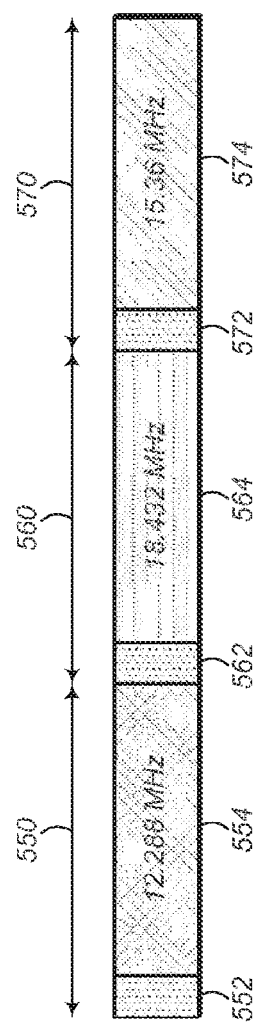
FIG. 6 illustrates PFDCH sampling rate varied on a per frame basis, according to one embodiment.

In particular, the sampling rate used for the data payload portion of a frame (i.e. the PFDCH) may be allowed to vary on a per frame basis. That is, a non-payload region such as 206 shown in FIG. 2 would use a fixed sampling rate (such as 12.288 MHz) which is known at a receiver. This non-payload region 206 may signal control information which informs the receiver as to the sampling rate which is used for the PFDCH 204 of the same frame 202. FIG. 6 shows an example of this control signaling. In frame 550, a sampling rate of 12.288 MHz to be used for the PFDCH 554 is signaled via control information in non-payload region 552. In frame 560, a sampling rate of 18.432 MHz to be used for the PFDCH 564 is signaled via control information in non-payload region 562. In frame 570, a sampling rate of 15.36 MHz to be used for the PFDCH 574 is signaled via control information in non-payload region 572.

FIG. 6 is intended to be illustrative only, and the use of and signaling of other sampling rates are not precluded. In another embodiment, PFDCH sampling rates may follow a fixed pattern. For example, the PFDCHs of odd-numbered frames may use a lower sampling rate such as 12.288 MHz, while the PFDCHs of even-numbered frames may use a higher sampling rate such as 18.432 MHz. This can be either predetermined or signaled to receiving devices. In yet another embodiment, the sampling rates to be used for received PFDCHs may be signaled separately to receivers rather than being included in control signaling contained within the same frame.

Distribution of Excess Samples to Cyclic Prefixes

In a physical sense, the PFDCH consists of a number of consecutive samples in the time domain. This number of samples is equal to the total number of samples in one frame minus the lengths in samples of any non-payload regions of the same frame. For example, there may be 12.288 million samples for the example sampling frequency of 12.288 MHz and example frame length of 1 second.

After the lengths of the OFDM symbols contained within the PFDCH have been determined, it is quite likely that the total number of samples consumed by these OFDM symbols may be less than the total number of samples assigned to the PFDCH. Depending upon the PFDCH partitioning as described earlier, OFDM symbols belonging to different PPDCHs may have different lengths due to differing FFT sizes and/or cyclic prefix lengths, and it is likely to be an impossible task to ensure that the sum of their lengths exactly equals the number of samples expected to be consumed by the PFDCH. However, it is disadvantageous to place constraints on FFT size selection, cyclic prefix length selection, and/or PFDCH partitioning into multiple PPDCHs, since this would severely reduce the flexibility that is desired for configuring a particular wireless frame. A method for using up any excess samples is required.

The exact number of excess samples ($N_{excess}$) to be dealt with for a particular PFDCH can be calculated as:

$$N_{excess} = N_{payload} - \sum_{i=0}^{N_{sym}-1} N_i \quad \text{equ. (3)}$$

where: $N_{payload}$ is the number of samples assigned to the PFDCH; $N_{sym}$ is the total number of OFDM symbols in the PFDCH (indexing of OFDM symbols begins at 0); and Ni is the number of samples in the ith OFDM symbol (equal to the corresponding FFT size plus the specified cyclic prefix length in samples). Note that not all of the OFDM symbols in a PFDCH may be the same size if multiple PPDCHs (with different FFT sizes and/or cyclic prefix lengths) are present.

The above equation can be simplified to:

$$N_{excess} = N_{payload} - \sum_{p=0}^{N_{PPDCH}-1} N_{p,sym} \times (N_{p,FFT} + N_{p,CP}) \quad \text{equ. (4)}$$

where: $K_{payload}$ is the number of samples assigned to the PFDCH; $N_{PPDCH}$ is the total number of PPDCHs in the PFDCH (indexing of PPDCHs begins at 0); $N_{p,sym}$ is the total number of OFDM symbols configured for the $p^{th}$ PPDCH; $N_{p,FFT}$ is the FFT size configured for the $p^{th}$ PPDCH; and $N_{p,CP}$ is the cyclic prefix length in samples configured for the $p^{th}$ PPDCH.

Figure 7:
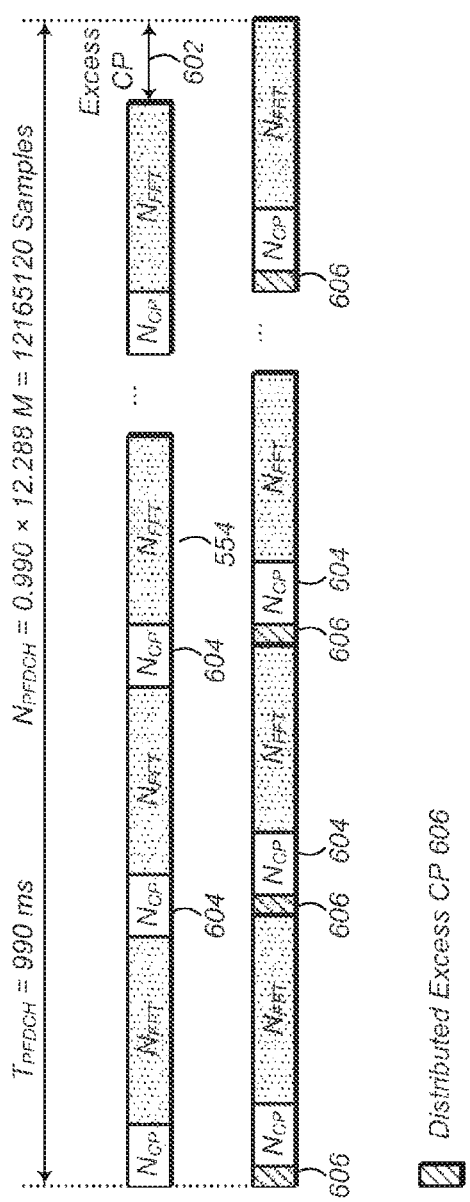
FIG. 7 illustrates an example of distributing excess samples to cyclic prefixes of OFDM symbols within the payload region of a frame, according to one embodiment.

FIG. 7 illustrates one example embodiment for distributing excess samples 602. In particular, the cyclic prefix lengths 604 for the first $N_{excess}$ mod $N_{sym}$ OFDM symbols within the PFDCH are each extended by $[N_{excess}/N_{sym}]$ samples 606. In addition, the cyclic prefix lengths 604 for the last $N_{sym}-(N_{excess}$ mod $N_{sym})$ OFDM symbols within the PFDCH are each extended by $[N_{excess}/N_{sym}]$ samples 606.

It should be appreciated that other embodiments for distributing the excess samples among the OFDM symbols within the PFDCH are also possible. For example, a value N, where N<$N_{sym}$, may be either signaled or predetermined. In order to distribute the excess samples, the cyclic prefix lengths for the first N OFDM symbols within the PFDCH are each extended by $[N_{excess}/N]$ samples. In addition, the cyclic prefix length for PFDCH OFDM symbol N+1 is extended by $$N_{excess}-N\times[N_{excess}/N] \text{ samples.}$$

It will be appreciated by those skilled in the art that further additional embodiments for distributing the excess PFDCH samples may be easily derived.

Payload Structure and Mapping

This section gives a detailed specification as to how the PFDCH of a wireless frame is structured, how payload partitions (PPDCHs) are specified, how PSDCHs are mapped to specific physical resources, etc. As such, the contents of this section build on the concepts that were introduced earlier.

The key element behind the design is the concept of mapping virtual resources to logical resources and then logical resources to physical resources.

Payload Partition Mapping

In a physical sense, the PFDCH consists of a number of consecutive samples in the time domain. This number of samples is equal to the total number of samples in one frame of any non-payload regions in the frame. For example, there may be 12.288 million samples for the example sampling frequency of 12.288 MHz and example frame length of 1 second.

In a logical sense, the PFDCH is composed of a number of OFDM symbols in the time domain and a number of subcarriers in the frequency domain. The sum of the lengths in samples of all OFDM symbols within the PFDCH prior to excess sample distribution to cyclic prefixes must be less than or equal to the number of samples available for the PFDCH as calculated above.

OFDM symbols belonging to the same PPDCH will essentially have the same lengths, subject to excess sample distribution to cyclic prefixes, but OFDM symbols belonging to different PPDCHs may have different lengths. Consequently, not all OFDM symbols within the PFDCH will necessarily have the same length.

Similarly, the number of subcarriers in the frequency domain is a function of the system bandwidth and the subcarrier spacing. The subcarrier spacing is dependent upon the selected FFT size and the sampling frequency, and may thus vary from one PPDCH to another, if distinct FFT sizes are configured for the two PPDCHs.

Different PPDCHs may be multiplexed in time and/or frequency.

Each PPDCH may be referenced via an index (e.g. PPDCH #0, PPDCH #1, . . . ), so that PSDCHs can be assigned to specific PPDCHs.

The exact physical resources allocated to a PPDCH may be specified via the following example sets of quantities:

FFT size and cyclic prefix length, which determine the length of each OFDM symbol within the PPDCH; Physical resources allocated to the PPDCH in the time dimension; and Physical resources allocated to the PPDCH in the frequency dimension.

Specifying PPDCH Physical Resources in the Time Dimension

In the time dimension, a specific PPDCH may be defined via the following example quantities:

Total number of OFDM symbols assigned to this PPDCH; Absolute OFDM symbol starting position within the PFDCH for this PPDCH (indexing begins at 0); OFDM symbol cluster periodicity for this PPDCH; and Number of consecutive OFDM symbols assigned per OFDM symbol cluster for this PPDCH.

There is no requirement that the total number of OFDM symbols assigned to a given PPDCH be an integer multiple of the number of consecutive OFDM symbols assigned per OFDM symbol cluster period for this PPDCH.

As an illustrative example, Table 4 shows example parameter settings that correspond to the example payload partitioning shown in FIGS. 3A and 3B, where there are three equally-sized (in the time dimension) PPDCHs. Here, there is a strict time division between the three PPDCHs. As a result, the PFDCH contains a total of 440+232+60=732 OFDM symbols in this example. In particular: PPDCH #0 contains OFDM symbols 0 through 439, each of length 9216 samples; PPDCH #1 contains OFDM symbols 440 through 671, each of length 17408 samples; and PPDCH #2 contains OFDM symbols 672 through 731, each of length 66560 samples.

Note that there are also some additional excess samples in this example, which may be distributed to the cyclic prefixes of various OFDM symbols.

TABLE 4

Example PPDCH parameters (time dimension) for FIGS. 3A and 3B

| Quantity | PPDCH #0 | PPDCH #1 | PPDCH #2 |
|---|---|---|---|
| PPDCH length (seconds) | 0.330 s | 0.330 s | 0.330 s |
| PPDCH length (samples) | 4,055,040 | 4,055,040 | 4,055,040 |
| FFT size | 8192 | 16384 | 65536 |
| CP length (samples) | 1024 | 1024 | 1024 |
| OFDM symbol length (samples) | 9216 | 17408 | 66560 |
| Total number of OFDM symbols | 440 | 232 | 60 |
| Absolute OFDM symbol starting position | 0 | 440 | 672 |
| OFDM symbol cluster periodicity | 1 | 1 | 1 |
| Number of consecutive OFDM symbols per OFDM symbol cluster | 1 | 1 | 1 |

In another illustrative example, the frame structure shown in the lower portion of FIG. 4. Table 5 shows example PPDCH parameters that may result in a frame structure illustrated in FIGS. 4A and 4B. In this example, the PFDCH contains a total of 754 OFDM symbols. In particular: PPDCH #0 contains OFDM symbols 0-15, 26-41, 52-67, . . . , 728-743; PPDCH #1 contains OFDM symbols 16-23, 42-49, 68-75, . . . , 744-751; and PPDCH #2 contains OFDM symbols 24-25, 50-51, 76-77, . . . , 752-753.

TABLE 5

Example PPDCH parameters (time dimension) for FIGS. 4A and 4B

| Quantity | PPDCH #0 | PPDCH #1 | PPDCH #2 |
|---|---|---|---|
| FFT size | 8192 | 16384 | 65536 |
| CP length (samples) | 1024 | 1024 | 1024 |
| OFDM symbol length (samples) | 9216 | 17408 | 66560 |
| Total number of OFDM symbols | 464 | 232 | 58 |
| Absolute OFDM symbol starting position | 0 | 16 | 24 |
| OFDM symbol cluster periodicity | 26 | 26 | 26 |
| Number of consecutive OFDM symbols per OFDM symbol cluster | 16 | 8 | 2 |

Note that there is no requirement that different PPDCHs have the same OFDM symbol cluster periodicity, nor that multiple PPDCHs are identically time-interleaved over their full lengths. For example, in Table 5, PPDCH #0 may be divided into two PPDCHs (#0A and #0B) that may either be interleaved with each other in a more macro sense. Table 6 illustrates an example of such a configuration. In particular, PPDCH #0A contains OFDM symbols 0-15, 52-67, 104-119, . . . , 672-687, 728-743; PPDCH #0B contains OFDM symbols 26-41, 78-93, 130-145, . . . , 646-661, 702-717; PPDCH #1 contains OFDM symbols 16-23, 42-49, 68-75, . . . , 744-751; and PPDCH #2 contains OFDM symbols 24-25, 50-51, 76-77, . . . , 752-753.

Alternatively, the two PPDCHs may occupy approximately the first and second halves of the PFDCH, respectively. Table 7 illustrates an example of such a configuration. In particular: PPDCH #0A contains OFDM symbols 0-15, 26-41, 52-67, . . . , 338-353, 364-379; PPDCH #0B contains OFDM symbols 390-405, 416-431, . . . , 702-717, 728-743; PPDCH #1 contains OFDM symbols 16-23, 42-49, 68-75, . . . , 744-751; and PPDCH #2 contains OFDM symbols 24-25, 50-51, 76-77, . . . , 752-753.

TABLE 6

Additional example PPDCH parameters (time dimension)

| Quantity | PPDCH #0A | PPDCH #0B | PPDCH #1 | PPDCH #2 |
|---|---|---|---|---|
| FFT size | 8192 | 8192 | 16384 | 65536 |
| CP length (samples) | 1024 | 1024 | 1024 | 1024 |
| OFDM symbol length (samples) | 9216 | 9216 | 17408 | 66560 |
| Total number of OFDM symbols | 240 | 224 | 232 | 58 |
| Absolute OFDM symbol starting position | 0 | 26 | 16 | 24 |
| OFDM symbol cluster periodicity | 52 | 52 | 26 | 26 |
| Number of consecutive OFDM symbols per OFDM symbol cluster | 16 | 16 | 8 | 2 |

TABLE 7

Additional example PPDCH parameters (time dimension)

| Quantity | PPDCH #0A | PPDCH #0B | PPDCH #1 | PPDCH#2 |
|---|---|---|---|---|
| FFT size | 8192 | 8192 | 16384 | 65536 |
| CP length (samples) | 1024 | 1024 | 1024 | 1024 |
| OFDM symbol length (samples) | 9216 | 9216 | 17408 | 66560 |
| Total number of OFDM symbols | 240 | 224 | 232 | 58 |
| Absolute OFDM symbol starting position | 0 | 390 | 16 | 24 |
| OFDM symbol cluster periodicity | 26 | 26 | 26 | 26 |
| Number of consecutive OFDM symbols per OFDM symbol cluster | 16 | 16 | 8 | 2 |

Specifying PPDCH Physical Resources in the Frequency Dimension

The subcarriers within each OFDM symbol can be divided into useful and non-useful subcarriers. Useful subcarriers lie within the system bandwidth minus a guard band, with the exception of the DC subcarrier which is a non-useful subcarrier. Non-useful subcarriers lie outside the system bandwidth minus the guard band.

The exact number of useful subcarriers is a function of the FFT size and sampling frequency, which together determine the subcarrier spacing and the system bandwidth.

Figure 8:
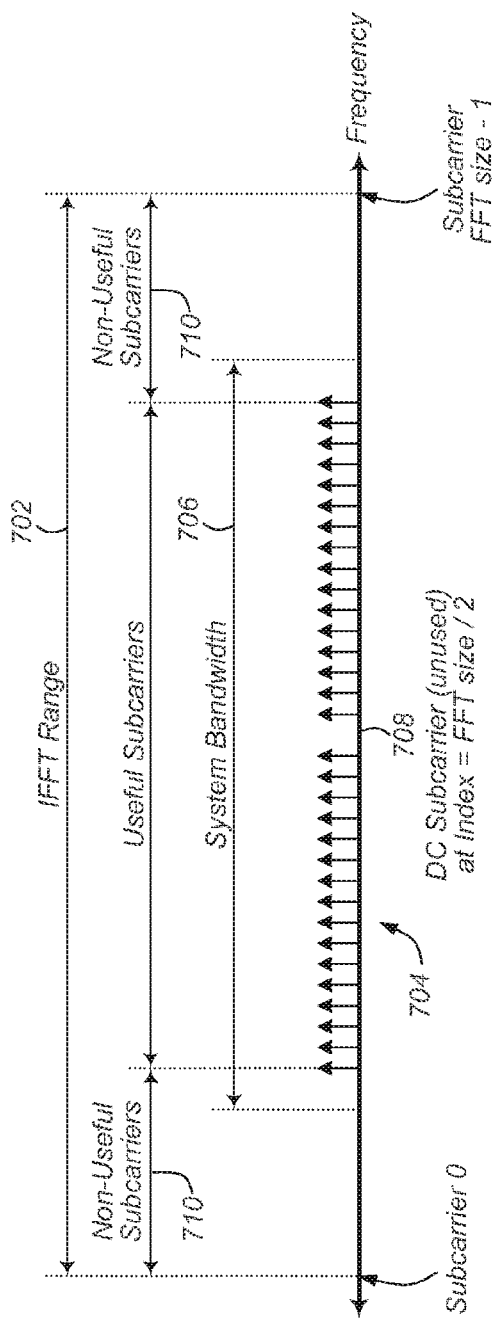
FIG. 8 illustrates useful subcarriers within an OFDM symbol, according to one embodiment.

FIG. 8 illustrates additional details relating to useful and non-useful subcarriers. Within the full IFFT/FFT range (size) 702, the useful subcarriers 704 are those which lie within the system bandwidth 706 minus a guard band, with the exception of the DC subcarrier 708. Non-useful subcarriers 710 lie outside the system bandwidth minus the guard band.

There is no requirement that all useful subcarriers in an OFDM symbol be explicitly assigned to a PPDCH. Note that each useful resource element can only be assigned to a maximum of one PPDCH. Any useful resource elements that are not associated with a PPDCH may be assigned a value of 0. Non-useful subcarriers may also be assigned a value of 0.

In the frequency dimension, a specific PPDCH may be defined via the specific quantities. For example, a specific PPDCH may defined by a number of useful subcarriers belonging to this PPDCH. This quantity must be less than or equal to the total number of all useful subcarriers per OFDM symbol. This specifies the actual size of the PPDCH in the frequency dimension. It should be appreciated that the DC subcarrier is not considered to be a useful subcarrier, so if the DC subcarrier happens to lie within a particular PPDCH, then that subcarrier is not counted against the number of useful subcarriers belonging to that PPDCH. In one example a specific PPDCH may defined by an absolute index of the first subcarrier belonging to this PPDCH. Subcarriers may be indexed beginning at 0 and proceeding sequentially upwards to the total number of subcarriers minus 1 (i.e. the FFT size minus 1). Subcarrier 0 is therefore essentially the lowest frequency subcarrier.

Multiple PPDCHs may be multiplexed beside each other in the frequency dimension. However, there is no actual interleaving of PPDCHs in the frequency dimension. That is, in the frequency dimension, each PPDCH occupies a contiguous set of physical subcarriers.

Figure 9:
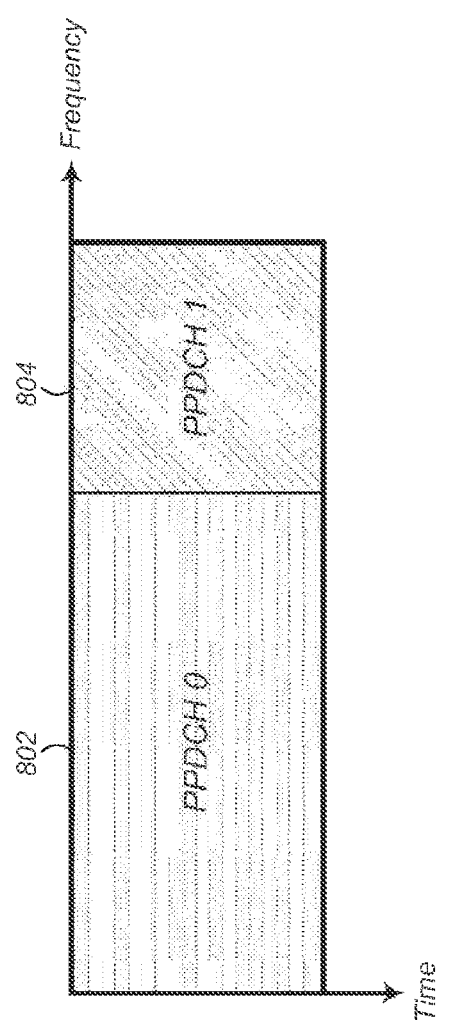
FIG. 9 illustrates an example of PPDCH frequency multiplexing, according to one embodiment.

FIG. 9 shows an example of two PPDCHs 802 and 804 that have been multiplexed beside each other in the frequency dimension. Approximately ⅔ of the useful subcarriers have been allocated to PPDCH #0 802, with the remaining ⅓ of the useful subcarriers being allocated to PPDCH #1 804. Table 8 contains the corresponding PPDCH parameters in the frequency dimensions for the two example PPDCHs 802 and 804 shown in FIG. 9. In this example, both PPDCHs have been configured to use the same FFT size and cyclic prefix length.

TABLE 8

Example PPDCH parameters (frequency dimension) for FIG. 9

| Quantity | PPDCH #0 | PPDCH #1 |
| --- | --- | --- |
| FFT size | 16384 | 16384 |
| CP length (samples) | 1024 | 1024 |
| Subcarrier spacing | 750 Hz | 750 Hz |
| System bandwidth | 6 MHz | 6 MHz |
| Total number of all useful subcarriers | 7600 | 7600 |
| Number of useful subcarriers assigned to this PPDCH | 5000 | 2600 |
| Index of the first subcarrier belonging to this PPDCH | 4392 | 9393 |

PSDCH Mapping Within a PPDCH

PSDCHs are mapped to virtual resources within their assigned PPDCH. Virtual resources are then mapped to logical resources within the same PPDCH, and then the logical resources of each PPDCH are mapped to actual physical resources within the PFDCH. This process is described in detail in the following sections.

Logical Resources for a PPDCH

Figure 10:
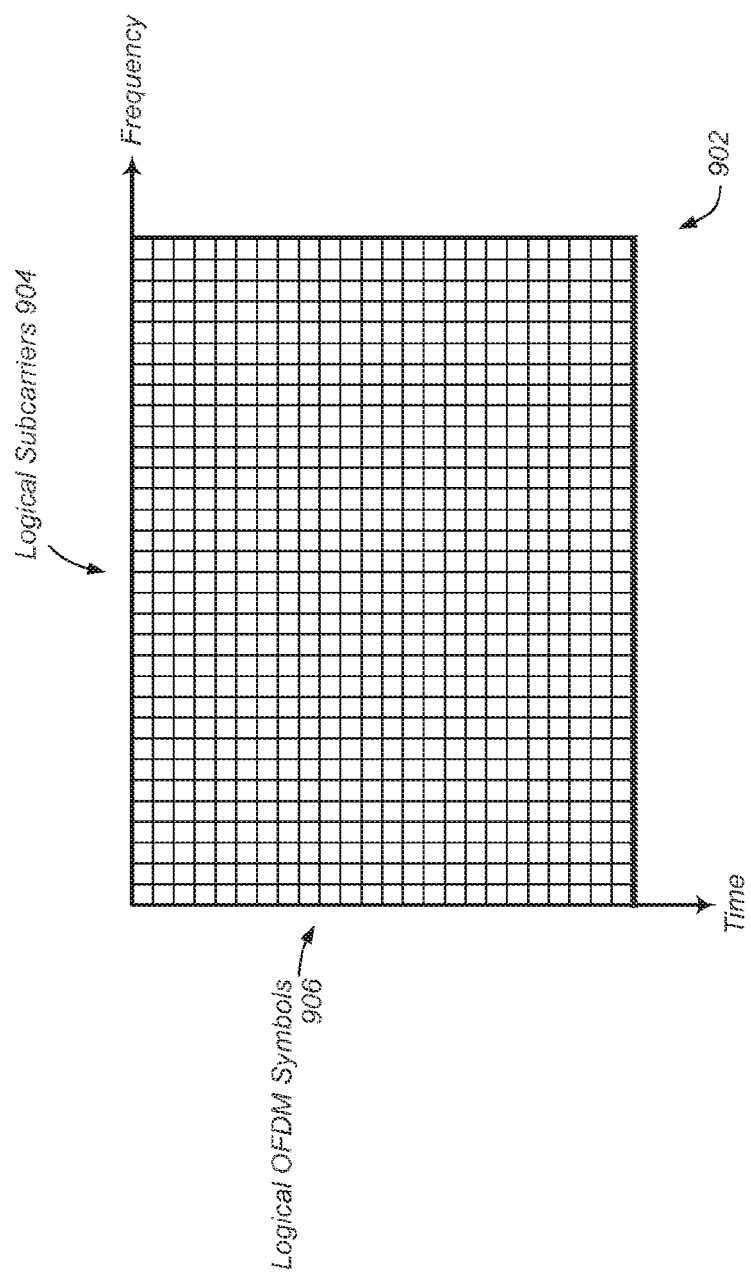
FIG. 10 illustrates the layout of logical resources within a PPDCH, according to one embodiment.

It has previously been described how a particular PPDCH is associated with corresponding physical resources. Regardless of what exact physical resources belong to a PPDCH, the logical resources of a PPDCH can be considered to be contiguous in both the frequency and time dimensions, as illustrated in FIG. 10. Here, the logical subcarriers 904 of a PPDCH 902 begin numbering at 0 at the left side of the diagram, which is the lowest frequency, and progress sequentially upwards to the right. Similarly, the logical OFDM symbols 906 of the PPDCH 902 begin numbering at 0 at the top of the diagram, which is earliest time, and progress sequentially upwards moving forward through time, toward the bottom of the diagram.

Figure 11:
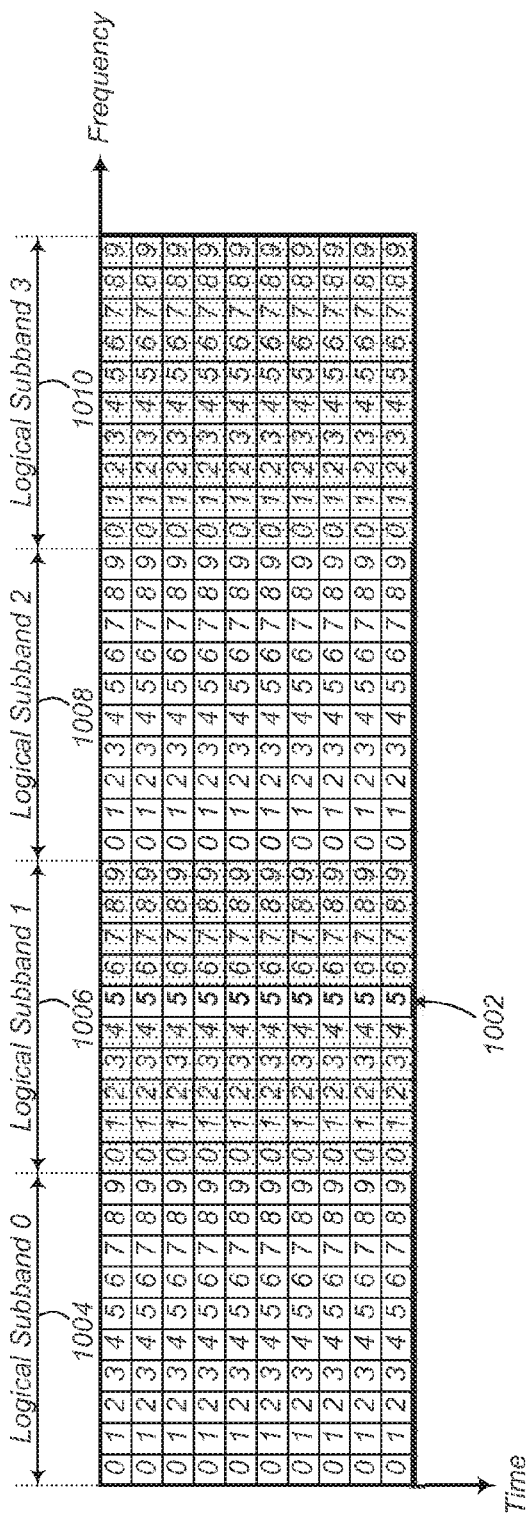
FIG. 11 illustrates logical stripes and logical subbands within a PPDCH, according to one embodiment.

FIG. 11 introduces additional logical resource concepts for the contents of a PPDCH. A stripe is a set of resources measuring one subcarrier in the frequency dimension and running for the full time duration of the PPDCH, or all of the OFDM symbols, in the time dimension. Stripes are grouped together in the frequency dimension into subbands, where the subband width of each subband in the frequency dimension is equal to the number of stripes specified for the PPDCH. Each logical subband is composed of a number of logical stripes as illustrated in the diagram, which shows four logical subbands 1004, 1006, 1008 and 1010, each composed of ten logical stripes. A particular stripe 1002 within the PPDCH's logical resources can be referenced via the logical subband index 1006 and the logical stripe index 1002 within that logical subband 1006. As shown in FIG. 11, logical subcarriers may begin with the lowest frequency subcarrier at the left and progress upwards in frequency while moving towards the right.

Logical subbands may be indexed beginning with 0 and progress sequentially upwards with frequency.

There is a constraint that the number of useful subcarriers assigned to a PPDCH must be an integer multiple of the subband-width for that same PPDCH, so that each PPDCH will always contain an integer number of subbands. However, there is no requirement that PPDCH assignments begin with subband 0 or end with subband N−1. In one example, the system might electively depopulate subbands at the band edges to facilitate spectrum sharing or otherwise constrain out-of-band emissions relative to a prescribed spectral mask.

Virtual Resources for a PPDCH

Corresponding to each logical subband containing a number of logical stripes is an equally-sized virtual subband containing the same number of virtual stripes. Within each subband, there exists a one-to-one mapping of virtual stripes to logical stripes on a per OFDM symbol basis. This may be considered to be conceptually equivalent to shuffling the virtual stripes in order to obtain the logical stripes. A virtual subband has the same index as the corresponding logical subband.

Figure 12:
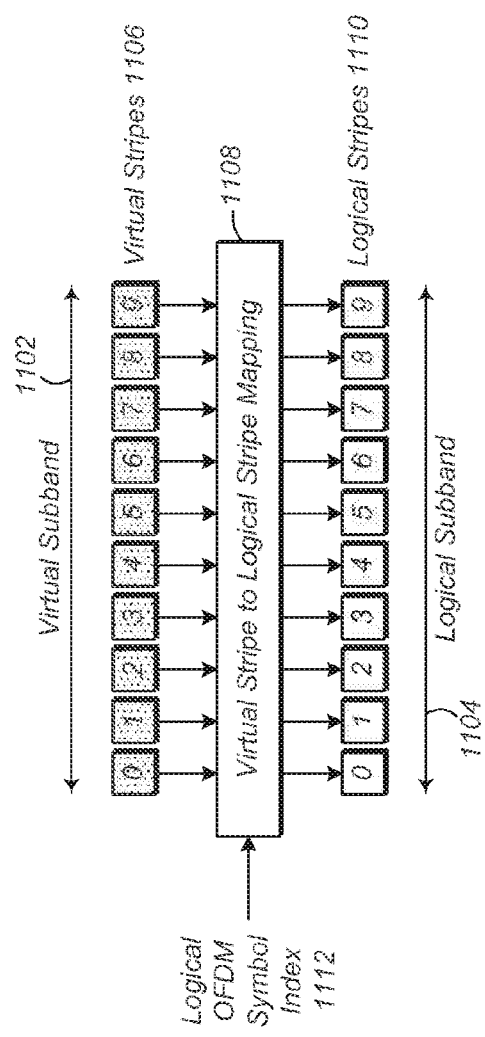
FIG. 12 illustrates a mapping of virtual stripes belonging to a virtual subband to logical stripes belonging to a logical subband, according to one embodiment.

FIG. 12 illustrates an example of a mapping of virtual stripes belonging to a virtual subband to logical stripes belonging to a logical subband. Here, each subband has a width of ten stripes ($W_{SB}=10$). The ten virtual stripes 1106 belonging to the virtual subband 1102 at the top have a one-to-one stripe mapping 1108 to the ten logical stripes 1110 belonging to the logical subband 1104 at the bottom. The stripe mapping 1108 is dependent on the current logical OFDM symbol index 1112, and may therefore vary from one logical OFDM symbol to the next.

Table 9 contains an example virtual-to-logical stripe mapping, with Table 10 containing the corresponding example logical-to-virtual stripe mapping. It should be appreciated that the stripe mapping may vary as a function of the logical OFDM symbol index and has a periodicity of $P_{SM}=10$ in the time dimension in this example. Without loss of generality, it may be assumed that virtual stripe #0 is always reserved for a reference symbol or pilot symbol. In Table 10, the logical stripes that contain reference symbols (i.e. which map to virtual stripe #0) have been highlighted with boldface text to show the reference symbol pattern being used in this example. In this example, the reference symbol pattern repeats every five logical OFDM symbols, while the data stripe mapping pattern repeats every ten logical OFDM symbols.

In Table 9, the logical OFDM symbol index, or the row index, and the virtual stripe index, or the column index, may be used to determine the table entry that corresponds to the logical stripe index for that particular pair of logical OFDM symbol and virtual stripe indices. Conversely, in Table 10, the logical OFDM symbol index, or the row index, and the logical stripe index, or the column index, may be used to determine the table entry that corresponds to the virtual stripe index for that particular pair of logical OFDM symbol and logical stripe indices.

TABLE 9

Example virtual stripe to logical stripe mapping

| Logical OFDM symbol index mod 10 | Virtual stripe index | | | | | | | | | |
|---|---|---|---|---|---|---|---|---|---|---|
| | 0 | 1 | 2 | 3 | 4 | 5 | 6 | 7 | 8 | 9 |
| 0 | 0 | 2 | 3 | 4 | 5 | 6 | 7 | 8 | 9 | 1 |
| 1 | 4 | 8 | 9 | 0 | 1 | 2 | 3 | 5 | 6 | 7 |
| 2 | 8 | 4 | 5 | 6 | 7 | 9 | 0 | 1 | 2 | 3 |
| 3 | 2 | 0 | 1 | 3 | 4 | 5 | 6 | 7 | 8 | 9 |
| 4 | 6 | 7 | 8 | 9 | 0 | 1 | 2 | 3 | 4 | 5 |
| 5 | 0 | 3 | 4 | 5 | 6 | 7 | 8 | 9 | 1 | 2 |
| 6 | 4 | 9 | 0 | 1 | 2 | 3 | 5 | 6 | 7 | 8 |
| 7 | 8 | 5 | 6 | 7 | 9 | 0 | 1 | 2 | 3 | 4 |
| 8 | 2 | 1 | 3 | 4 | 5 | 6 | 7 | 8 | 9 | 0 |
| 9 | 6 | 8 | 9 | 0 | 1 | 2 | 3 | 4 | 5 | 7 |

TABLE 10

Example logical stripe to virtual stripe mapping

| Logical OFDM symbol index mod 10 | Logical stripe index | | | | | | | | | |
|---|---|---|---|---|---|---|---|---|---|---|
| | 0 | 1 | 2 | 3 | 4 | 5 | 6 | 7 | 8 | 9 |
| 0 | 0 | 9 | 1 | 2 | 3 | 4 | 5 | 6 | 7 | 8 |
| 1 | 3 | 4 | 5 | 6 | 0 | 7 | 8 | 9 | 1 | 2 |
| 2 | 6 | 7 | 8 | 9 | 1 | 2 | 3 | 4 | 0 | 5 |
| 3 | 1 | 2 | 0 | 3 | 4 | 5 | 6 | 7 | 8 | 9 |
| 4 | 4 | 5 | 6 | 7 | 8 | 9 | 0 | 1 | 2 | 3 |
| 5 | 0 | 8 | 9 | 1 | 2 | 3 | 4 | 5 | 6 | 7 |
| 6 | 2 | 3 | 4 | 5 | 0 | 6 | 7 | 8 | 9 | 1 |
| 7 | 5 | 6 | 7 | 8 | 9 | 1 | 2 | 3 | 0 | 4 |
| 8 | 9 | 1 | 0 | 2 | 3 | 4 | 5 | 6 | 7 | 8 |
| 9 | 3 | 4 | 5 | 6 | 7 | 8 | 0 | 9 | 1 | 2 |

In one example, the set of parameters for each PPDCH include one or more quantities. For example, the set of parameters may include a subband width in the frequency dimension, which may be in units of stripes or subcarriers. In one example, the set of parameters may further include stripe mapping periodicity in the time dimension, which may be in units of logical OFDM symbols. It should be appreciated that the number of logical OFDM symbols in a PPDCH is not required to be an integer multiple of the stripe mapping periodicity. In one example, the set of parameters may further include stripe mapping, which may be in the form of a table with the number of columns equal to the subband width and the number of rows equal to the stripe mapping periodicity. Alternatively, a more compact form of signaling the stripe mapping such as described in the following section may be used.

It should be appreciated that the concept of virtual OFDM symbols is not defined since virtual OFDM symbols are essentially directly equivalent to logical OFDM symbols. For example, virtual OFDM symbol #N is the same as logical OFDM symbol #N.

Compact Signaling of Logical-to-Virtual Stripe Mapping

In one example, signaling a complete logical-to-virtual stripe mapping over the air may result in an inefficient use of limited wireless resources due to the potential size of the stripe mapping table that must be transmitted for each PPDCH. Thus, an example of a more compact form of signaling the stripe mapping to be used to the receiver is described. This compact signaling then allows the full logical to virtual stripe mapping table to be constructed at the receiver for each PPDCH.

Two desirable requirements for a good virtual↔logical stripe mapping are as follows. First, the stripe mapping should support the ability to have scattered reference symbols. For example, the stripe mapping should support the ability to map reference symbols to different logical stripes in different logical OFDM symbols. Second, the stripe mapping should vary the virtual data stripes that get mapped to the logical stripes adjacent to the reference symbol to avoid some virtual data stripes consistently having better channel estimates than other virtual data stripes.

In one example, a stripe mapping algorithm for each PPDCH may include a number of quantities, which would reduce the amount of information needing to be signaled over the air. For example, stripe mapping periodicity ($P_{SM}$) may be the same quantity as has previously been defined. A vector of reference symbol logical stripe mapping positions ($L_{RS}(k)$) may have a length equal to the stripe mapping periodicity. For each OFDM symbol k (modulo $P_{SM}$), this would specify the logical stripe to which virtual stripe 0 (which contains reference symbols) maps. This allows the reference symbol position to be varied on an OFDM symbol by symbol basis. A vector of stripe rotation may have values with length equal to the stripe mapping periodicity. For each OFDM symbol k (modulo $P_{SM}$). This would specify the "rotation" to be applied to either: the virtual stripes other than virtual stripe 0, or all of the virtual stripes that carry data rather than a reference symbol, in order to obtain logical stripe indices. This quantity may be labelled $R_{VL}(k)$; or the logical stripes other than the logical stripe $L_{RS}(k)$ which carries the reference symbol, or all of the logical stripes that carry data rather than a reference symbol, in order to obtain virtual stripe indices. This quantity may be labelled $R_{LV}(k)$.

Table 11 contains the compact form of specifying the stripe mapping for the example corresponding to Table 9 and Table 10. Recall that for this example, the stripe mapping periodicity is $P_{SM}=10$, and the width of the subband is $W_{SB}=10$. In addition, the relation between the virtual to logical and logical to virtual stripe rotations can be expressed as:

$$R_{VL}(k)+R_{LV}(k)=W_{SB}-1. \quad \text{equ. (5)}$$

TABLE 11

Example compact form for signaling of stripe mapping data

| Logical OFDM symbol index mod 10 (k) | Logical stripe for reference symbol ($L_{RS}(k)$) | Virtual to logical stripe rotation for data ($R_{VL}(k)$) | Logical to virtual stripe rotation for data ($R_{LV}(k)$) |
|---|---|---|---|
| 0 | 0 | 1 | 8 |
| 1 | 4 | 7 | 2 |
| 2 | 8 | 3 | 6 |
| 3 | 2 | 9 | 0 |
| 4 | 6 | 6 | 3 |
| 5 | 0 | 2 | 7 |
| 6 | 4 | 8 | 1 |
| 7 | 8 | 4 | 5 |
| 8 | 2 | 0 | 9 |
| 9 | 6 | 7 | 2 |

Figure 13:
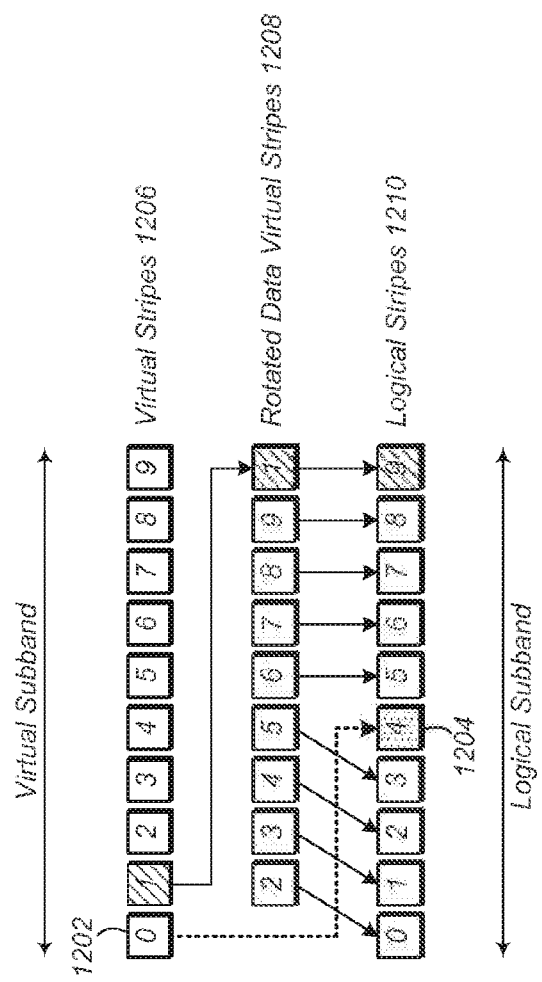
FIG. 13 illustrates an example rotation and mapping of virtual stripes to logical stripes, according to one embodiment.

FIG. 13 illustrates a conceptual view of how the virtual to logical stripe rotation works. This example corresponds to modulo logical OFDM symbol k=6 from Table 11. As can be seen, the reference symbol on virtual stripe 0 1202 is mapped straight through to logical stripe $L_{RS}(k)=4$ 1204. A rotation (modulo $W_{SB}=10$) of $R_{VL}(k)=8$ is applied to the data virtual stripes 1206. These rotated data virtual stripes 1208 are then mapped essentially straight through to the available logical stripes 1210, which include all of the logical stripes with the exception of logical stripe #4 1204 which is already occupied by the reference symbol.

Figure 14:
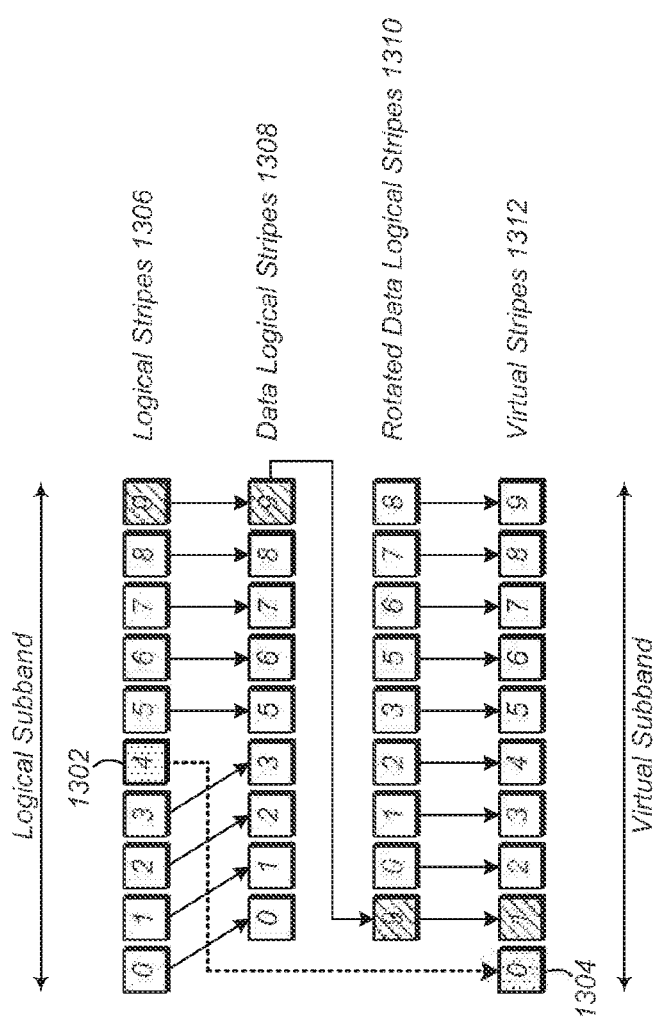
FIG. 14 illustrates an example rotation and mapping of logical stripes to virtual stripes, according to one embodiment.

FIG. 14 shows the corresponding logical to virtual stripe rotation and mapping for modulo logical OFDM symbol k=6 from Table 11. Here, the logical stripe carrying the reference symbol $L_{RS}(k)=4$ 1302 is extracted and mapped onto virtual stripe #0 1304. A rotation modulo $W_{SB}=10$ of $R_{LV}(k)=1$ is applied to the data logical stripes 1308, and then these rotated data logical stripes 1310 are mapped straight through onto the data virtual stripes 1312 #1 through #9.

Let k represent the logical OFDM symbol index modulo the stripe mapping periodicity ($P_{SM}$), which equals 10 in this example. At the transmitter, a reference symbol for modulo symbol k is mapped from virtual stripe index 0 to the corresponding logical stripe index $L_{RS}(k)$ ($0 \le L_{RS}(k) < W_{SB}$) given in the table.

$$S_L(k, L_{RS}(k)) = S_V(k, 0) \qquad \text{equ. (6)}$$

At the receiver, this process is reversed, and a reference symbol for modulo symbol k is mapped from the corresponding logical stripe index $L_{RS}(k)$ given in the table back to virtual stripe index 0.

$$S_V(k, 0) = S_L(k, L_{RS}(k)) \qquad \text{equ. (7)}$$

For virtual to logical data stripe mapping at the transmitter, the following example procedure can be followed. Let $S_V(k,i)$ ($0 < S_V(k,i) < W_{SB}$) and $S_L(k,i)$ ($0 \le S_L(k,i) < W_{SB}$ and $S_L(k,i) \ne L_{RS}(k)$) represent a corresponding pair of virtual and logical stripe indices that map to each other for modulo symbol k ($0 \le k < P_{SM}$). Let $R_{VL}(k)$ ($0 \le R_{VL}(k) < W_{SB}$ and $R_{VL}(k) \ne (L_{RS}(k)+W_{SB}-1) \mod W_{SB}$) represent the virtual to logical stripe rotation for data for modulo symbol k. The logical data stripe index $S_L(k,i)$ corresponding to a particular virtual data stripe index $S_V(k,i)$ ($0 < i < W_{SB}$) can then be calculated as follows, noting that for a valid stripe mapping $R_{VL}(k) \ne (L_{RS}(k)+W_{SB}-1) \mod W_{SB}$ implies that $R_{VL}(k)+1 \ne L_{RS}(k)$ for all k.

$$\tilde{L}(k) = \begin{cases} L_{RS}(k) & \text{if } R_{VL}(k)+1 < L_{RS}(k) \\ L_{RS}(k) + W_{SB} & \text{if } R_{VL}(k)+1 > L_{RS}(k) \end{cases} \qquad \text{equ. (8)}$$

$i = 1 \ldots W_{SB} - 1$ $$S_V(k, i) = 1 \qquad \text{equ. (9)}$$

$$\tilde{S}(k, i) = S_V(k, i) + R_{VL}(k) \qquad \text{equ. (10)}$$

$$S_L(k, i) = \begin{cases} \tilde{S}(k, i) \mod W_{SB} & \text{if } \tilde{S}(k, i) < \tilde{L}(k) \\ (\tilde{S}(k, i) + 1) \mod W_{SB} & \text{if } \tilde{S}(k, i) \ge \tilde{L}(k) \end{cases} \qquad \text{equ. (11)}$$

At the receiver, the virtual data stripe index $S_V(k,i)$ corresponding to a particular logical data stripe index $S_L(k,i)$ ($0 < i < W_{SB}$ and $i \ne L_{RS}(k)$) can then be calculated as shown below. $R_{LV}(k) = W_{SB} - R_{VL}(k) - 1$ represents the virtual to logical stripe rotation for data for modulo symbol k.

$$x(k) = W_{SB} - R_{LV}(k) \qquad \text{equ. (12)}$$

$i = 0 \ldots W_{SB} - 1$ and $i = L_{RS}(k)$ $$S_L(k, i) = 1 \qquad \text{equ. (13)}$$

If $x(k) < L_{RS}(k)$:

$$S_V(k, i) = \begin{cases} (S_L(k, i) + R_{LV}(k)) \mod W_{SB} & \text{if } S_L(k, i) < x(k) \text{ or } S_L(k, i) > L_{RS}(k) \\ (S_L(k, i) + R_{LV}(k) + 1) \mod W_{SB} & \text{if } x(k) \le S_L(k, i) < L_{RS}(k) \end{cases} \qquad \text{equ. (14)}$$

Conversely, if $x(k) \ge L_{RS}(k)$:

$$S_V(k, i) = \begin{cases} (S_L(k, i) + R_{LV}(k)) \mod W_{SB} & \text{if } L_{RS}(k) < S_L(k, i) < x(k) \\ (S_L(k, i) + R_{LV}(k) + 1) \mod W_{SB} & \text{if } S_L(k, i) < L_{RS}(k) \text{ or } S_L(k, i) \ge x(k) \end{cases} \qquad \text{equ. (15)}$$

Table 12 summarizes the list of parameters that need to be provided for each PPDCH within the PFDCH.

TABLE 12

Summary of parameters required for each PPDCH

| Parameter Category | Parameter |
|---|---|
| General | PPDCH index (may be implicitly signaled by position within a list of PPDCHs) |
| | FFT size |
| | Cyclic prefix length (in samples) |
| Time dimension | Total number of OFDM symbols assigned to this PPDCH |
| | Absolute OFDM symbol starting position within the PFDCH for this PPDCH |
| | OFDM symbol cluster periodicity for this PPDCH |
| | Number of consecutive OFDM symbols assigned per OFDM symbol cluster for this PPDCH |
| Frequency dimension | Number of useful subcarriers assigned to this PPDCH (must be an integer multiple of the subband width further below) |
| | Absolute index of the first subcarrier belonging to this PPDCH |
| Stripe mapping | Subband width in the frequency dimension (in units of stripes or subcarriers) |
| | Stripe mapping periodicity in the time dimension (in units of logical OFDM symbols) |
| | Virtual ↔ Logical stripe mapping table or compact stripe mapping signaling format |

Mapping a PSDCH to Virtual Resources

Virtual stripe #0 may always be reserved for reference symbols. This does not result in any loss of generality since virtual stripe #0 may be mapped to any desired logical stripe.

The reference symbol density may easily be calculated as the reciprocal of the subband width. In the examples given above with a subband width of 10, the reference symbol density is 10%. Conversely, a desired reference symbol density can also be used to obtain the appropriate subband width to configure.

A subband block is defined as a set of resource elements measuring one subband in the frequency dimension by one OFDM symbol in the time dimension. Resources may be allocated to a PSDCH in units of subband blocks, where a subset of the virtual stripes within each virtual subband may be assigned to a particular PSDCH.

Virtual resources may be assigned to a PSDCH via the following parameters:
Total number of subband blocks allocated to this PSDCH; subband index of the first subband block allocated to this PSDCH; subband cluster size or the number of consecutive subband blocks per subband cluster period allocated to this PSDCH; the first subband for a logical OFDM symbol is considered to be consecutive to the last subband for the preceding logical OFDM symbol; subband cluster periodicity for this PSDCH which specifies the periodicity of successive subband clusters that are allocated to this PSDCH; index of the first allocated virtual stripe within a virtual subband for this PSDCH; strip cluster size or the number of consecutive allocated virtual stripes within a virtual subband for this PSDCH; index of the first logical OFDM symbol occupied by this PSDCH; logical OFDM symbol cluster size or the number of consecutive logical OFDM symbols per logical OFDM symbol cluster occupied by this PSDCH; and logical OFDM symbol cluster periodicity for this PSDCH.

It should be appreciated that the total number of resource elements allocated to a PSDCH may be obtained by multiplying the total number of allocated subband blocks by the number of consecutive allocated virtual stripes within a virtual subband.

Figure 15:
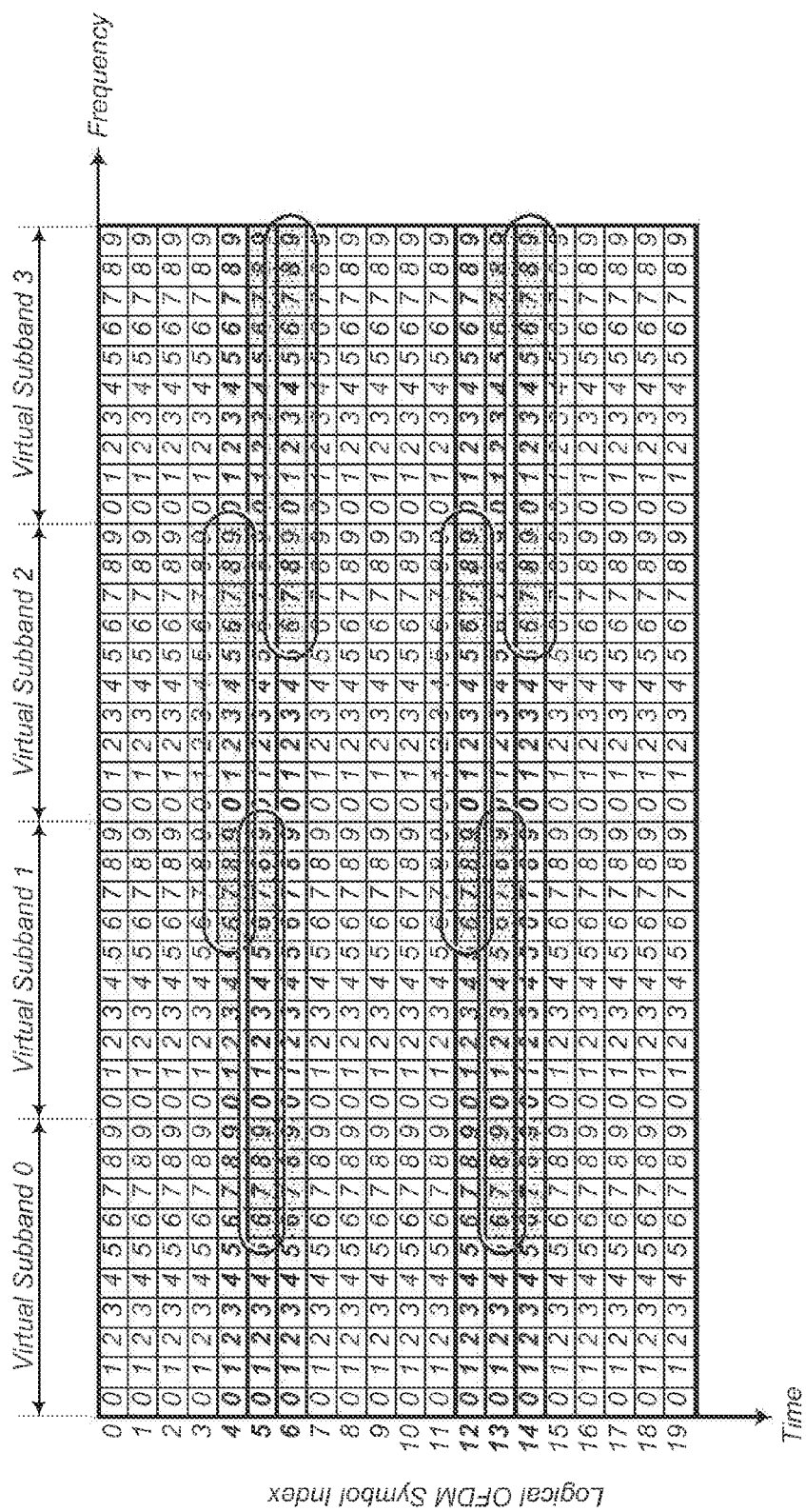
FIG. 15 illustrates an example of mapping a Physical Service Data Channel (PSDCH) to virtual resources of a PPDCH, according to one embodiment.

FIG. 15 illustrates how the above parameters can be used to map a PSDCH onto a set of virtual resources within a PPDCH. Table 13 contains the parameters that correspond to the example PSDCH mapping shown in FIG. 15. In this example, the total number of resource elements allocated to this PSDCH is equal to 16, or the total number of allocated subband blocks, multiplied by 4, or the number of consecutive allocated virtual stripes within a virtual subband, which equals 64. In the diagram, most but not all of the subband clusters 1402 have been circled to show which subbands belong to which subband clusters.

TABLE 13

Example PSDCH virtual resource mapping parameters

| Parameter | Value |
| --- | --- |
| Total number of allocated subband blocks | 16 |
| Subband index of first subband block | 1 |
| Subband cluster size | 2 |
| Number of consecutive subband blocks per subband cluster period | |
| Subband cluster periodicity | 3 |
| Index of first allocated virtual stripe within a virtual subband | 6 |
| Stripe cluster size | 4 |
| Number of consecutive allocated virtual stripes within a virtual subband | |
| Index of first occupied logical OFDM symbol | 4 |
| Logical OFDM symbol cluster size | 3 |
| Number of consecutive logical OFDM symbols per OFDM symbol period | |
| Logical OFDM symbol cluster periodicity | 8 |

Within a virtual resource mapping for a PSDCH, modulation symbols may be mapped to resource elements beginning with the first allocated virtual stripe of the first allocated subband block of the first occupied logical OFDM symbol, and progressing by virtual stripe within each subband block, then by subband block within the same logical OFDM symbol, and finally by logical OFDM symbol.

In the above example, modulation symbols will be mapped to virtual stripes 6/7/8/9 of virtual subband 1 and logical OFDM symbol 4, then to virtual stripes 6/7/8/9 of virtual subband 2 and logical OFDM symbol 4, then to virtual stripes 6/7/8/9 of virtual subband 0 and OFDM symbol 5, then to virtual stripes 6/7/8/9 of virtual subband 1 and OFDM symbol 5, and so on until the total number of allocated subband blocks has been processed.

Frame Content Description Provided to the Receiver

In one example, information about the payload content formatting of each frame, including information on the encoding, FFT sizes, etc, is provided to the receiver to facilitate the receiver processing and decoding of the payload contents. There are a variety of methods that may be used to communicate this formatting information to the receiver. For example, the payload content descriptions could be signaled within each frame in one of the non-payload regions shown in FIG. 2. Alternatively, if the payload content structure varies more slowly than on a frame-by-frame basis, :hen the payload content descriptions could be signaled on an as-required basis.

In one example, the receiver is provided with the number of distinct PPDCHs in the frame and the number of PSDCHs in the frame. For each PPDCH, the receiver is further provided with physical resources allocated to that PPDCH, FFT size, and cyclic prefix length. The physical resources allocated to that PPDCH may include the number of OFDM symbols allocated to that PPDCH, as well as which particular symbols are allocated to that PPDCH. It should be appreciated that distinct PPDCHs may be interleaved with each other. For each PSDCH, the receiver is further provided with service associated with that PSDCH, physical resources allocated to that PSDCH, modulation used for that PSDCH, and transport block size in bytes. The service associated with that PSDCH may be thought of as the data stream flow to which a particular PSDCH belongs. For example, a specific television program may be considered to be a particular service.

Table 14, Table 15, and Table 16, respectively, provide more detailed descriptions of the parameter fields that may be provided to the receiver. One PFDCH descriptor, listed in Table 14, may be required for each frame. One PPDCH descriptor, listed in Table 15, may be required for each PPDCH contained in the frame. One PSDCH descriptor, listed in Table 16, may be required for each PSDCH contained in the frame.

TABLE 14

PFDCH descriptor
Field description

Number of PPDCHs

TABLE 15

PPDCH descriptor
Field description

FFT size
(e.g. 2048, 4096, 8192, 16384, 32768, 65536)
Cyclic prefix length
Total number of OFDM symbols in this PPDCH
Absolute OFDM symbol starting position for this PPDCH
OFDM symbol cluster periodicity
OFDM symbol cluster size
(Number of consecutive OFDM symbols per OFDM symbol cluster)
Number of useful subcarriers for this PPDCH
Absolute index of the first subcarrier belonging to this PPDCH
Subband width
(Note that the number of useful subcarriers belonging to the PPDCH must be an integer multiple of the subband width)
Stripe mapping periodicity in the time dimension
Logical-to-virtual stripe mapping table
or
Compact stripe mapping parameters
Number of PSDCHs in the PPDCH

TABLE 16

PSDCH descriptor
Field description

Figure 16:
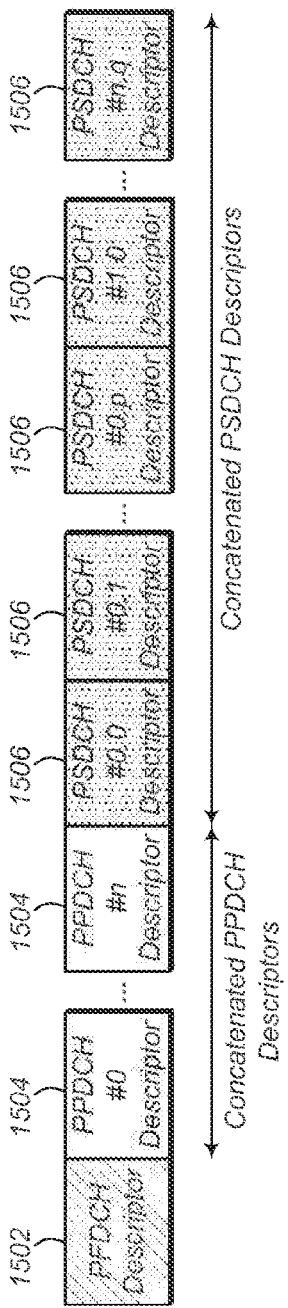
FIG. 16 illustrates an example of concatenated Physical Frame Data CHannel (PFDCH), PPDCH, and PSDCH descriptors for communication to a receiver, according to one embodiment.

Service associated with this PSDCH
Transport block size
FEC coding type
(e.g. Turbo, Low Density Parity Check (LDPC))
Modulation level
(e.g. QPSK, 16QAM, 64QAM, 256QAM)
Total number of subband blocks for this PSDCH
Subband index of the first subband block for this PSDCH
Subband cluster size for this PSDCH
Subband cluster periodicity for this PSDCH
Index of the first allocated virtual stripe within a virtual subband for this PSDCH
Number of consecutive allocated virtual stripes within a virtual subband for this PSDCH
Index of the first logical OFDM symbol occupied by this PSDCH
Logical OFDM symbol cluster size
(Number of consecutive logical OFDM symbols per OFDM symbol period occupied by this PSDCH)
Logical OFDM symbol cluster periodicity for this PSDCH FIG. 16 shows an example of how all of the various descriptors may be communicated to the receiver. In this example, the single PFDCH descriptor 1502 per frame occurs first, immediately followed by all of the concatenated PPDCH descriptors 1504. This frame, for example, contains n+1 PPDCHs. This is then followed by all of the concatenated PSDCH descriptors 1506. In this frame, for example, PPDCH #0 has p+1 PSDCHs and PPDCH #n has q+1 PSDCHs.

The ordering of the descriptors shown in FIG. 16 can easily be rearranged if so desired. For example, the PSDCH descriptors associated with a particular PPDCH may follow immediately after the descriptor for that PPDCH, instead of all being concatenated together following the group of concatenated PPDCH descriptors.

Figure 17:
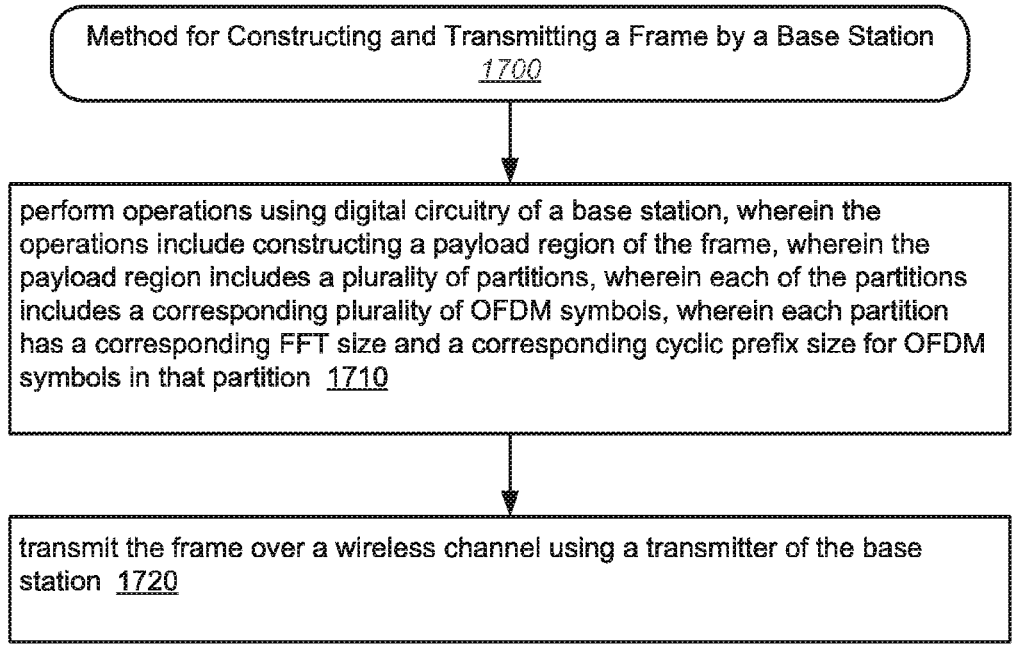
FIG. 17 illustrates one embodiment of a method for constructing and transmitting a frame by a base station, where the frame includes a plurality of partitions, each having a corresponding FFT size and a corresponding cyclic prefix size.

In one set of embodiments, a method 1700 for constructing and transmitting a frame may include the actions shown in FIG. 17. The method 1700 may also include any subset of the features, elements and embodiments previously described. The method 1700 may be implemented by a base station or an access point, for example.

At step 1710, digital circuitry of the base station may perform operations, wherein the operations include constructing a payload region of the frame, wherein the payload region includes a plurality of partitions, wherein each of the partitions includes a corresponding plurality of OFDM symbols, wherein each partition has a corresponding FFT size and a corresponding cyclic prefix size for OFDM symbols in that partition.

At step 1720, a transmitter of the base station may transmit the frame over a wireless channel.

In some embodiments, the operations also include embedding signaling information in a non-payload region of the frame, e.g., as variously described above. The signaling information indicates the FFT size and the cyclic prefix size for each of the partitions. In other embodiments, the signaling information may be embedded elsewhere, e.g., in a previous frame.

In some embodiments, each of the partitions includes a corresponding set of overhead resource elements, such as reference symbols. In these embodiments, the above-described operations may also include scheduling symbol data from one or more service data streams to each of the partitions after having reserved the overhead resource elements within the frame.

Different partitions may have different values of FFT size, and thus, different values of subcarrier spacing. For example, the subcarrier spacing for any given partition is the ratio of sample rate to the FFT size for that partition. Consequently, the different partitions will have different amounts of Doppler tolerance, or tolerance to Doppler shift due to motion of user devices. For example, a first of the partitions may be targeted for transmission to mobile devices, while a second of the partitions is targeted for transmission to fixed devices. Thus, the FFT size corresponding to the first partition is configured to be smaller than the FFT size corresponding to the second partition. This allows the first partition to have larger subcarrier spacing, and thus, greater tolerance to the frequency shift of subcarriers due to motion of the mobile devices.

Furthermore, different partitions may have different cyclic prefix sizes, or guard interval durations, and thus, be able to tolerate different amounts of delay spread. For example, a first of the partitions may be targeted for transmission to a first set of user devices that are expected to have large delay spreads, while a second of the partitions is targeted for transmission to a second set of user devices that are expected to have smaller delay spreads. Thus, the cyclic prefix size for the first partition is configured to be larger than the cyclic prefix size for the second partition.

A given user device may receive the transmitted frame using a wireless receiver, and extract the OFDM symbols from the partition to which the user device has been assigned. The OFDM symbols are decoded to obtain digital information signals, which are then displayed or otherwise outputted to a user. The base station may signal to each user device or each type of user device the partition to which it is assigned. The base station may also signal the type of service carried in each partition. The partition may include one or more service data streams, as variously described herein. In the case that the partition includes more than one service data stream, the user device may extract OFDM symbols from one or more of the service data streams for which it has been granted permission to access. The base station may signal to the user device which service data streams it is permitted to access, for example, based on permission control information provided by the broadcast gateway.

Figure 18:
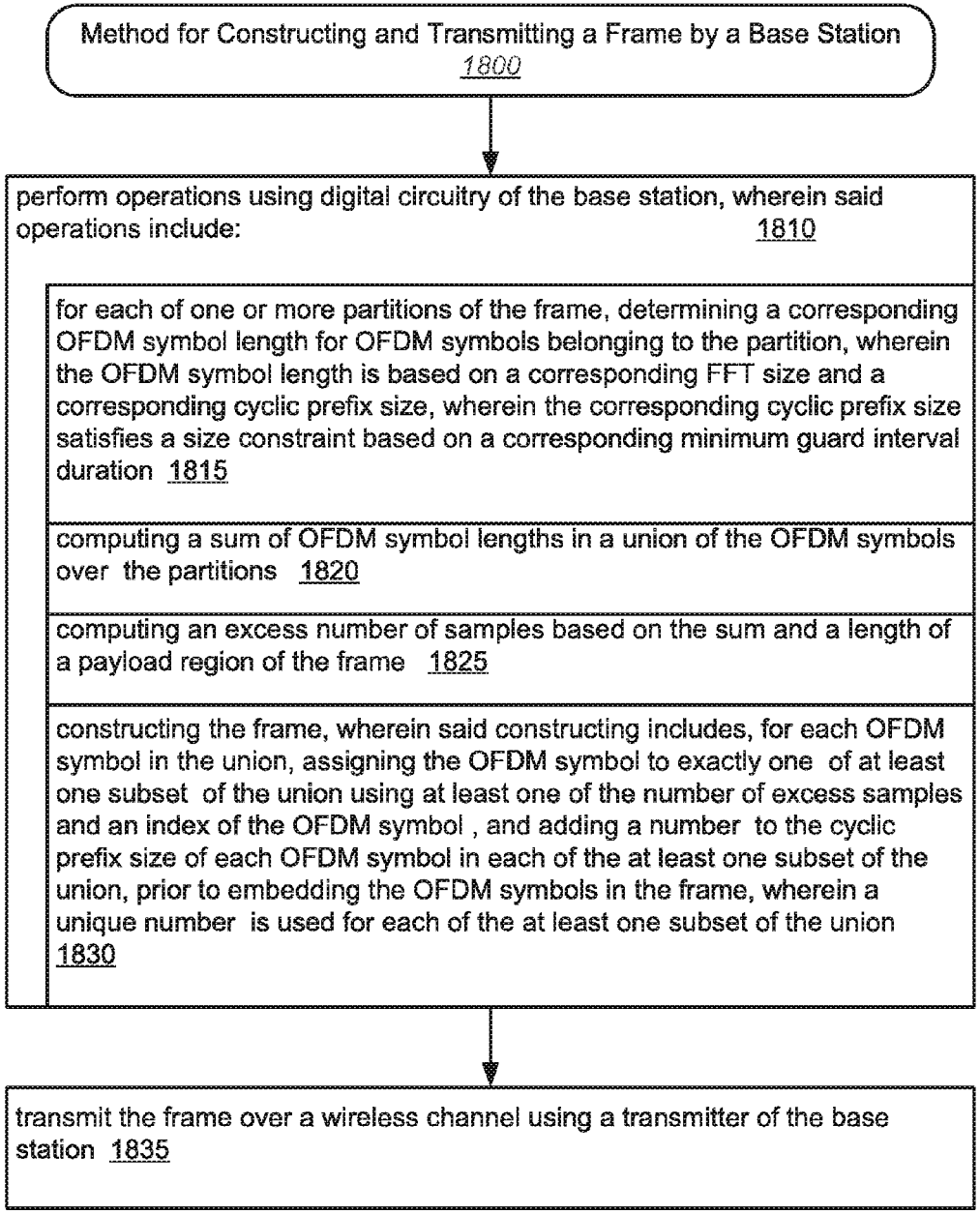
FIG. 18 illustrates one embodiment of a method for constructing and transmitting a frame by a base station, where excess samples are distributed to the cyclic prefixes of OFDM symbols in the frame.

In one set of embodiments, a method 1800 for constructing and transmitting a frame having a specified temporal length may include the actions shown in FIG. 18. The method 1800 may also include any subset of the features, elements and embodiments previously described. The method 1800 may be implemented by a base station or access point, for example, and may enable flexibility in configuring transmissions from the base station.

At step 1810, digital circuitry of the base station may perform operations, where the operations include steps 1815 through 1830, as follows.

At step 1815, for each of one or more partitions of the frame, the digital circuitry may determine a corresponding OFDM symbol length for OFDM symbols belonging to the partition, wherein the OFDM symbol length is based on a corresponding FFT size and a corresponding cyclic prefix size, wherein the corresponding cyclic prefix size satisfies a size constraint based on a corresponding minimum guard interval duration.

At step 1820, the digital circuitry may compute a sum of OFDM symbol lengths, in terms of samples, in a union of the OFDM symbols over the partitions.

At step 1825, the digital circuitry may compute a number of excess samples based on the sum and a length, in term of samples, of a payload region of the frame.

At step 1830, the digital circuitry may construct the frame. The action of constructing the frame may include, for example, for each OFDM symbol in the union, assigning the OFDM symbol to exactly one of at least one subset of the union using at least one of the number of excess samples and an index of the OFDM symbol, and adding a number to the cyclic prefix size of each OFDM symbol in each of the at least one subset of the union, prior to embedding the OFDM symbols in the frame, wherein a unique number is used for each of the at least one subset of the union.

Each OFDM symbol belongs to one and only one of the subsets. In other words, the intersection of any two subsets is null, and the union of all of the subsets is the union of all of the OFDM symbols in the frame.

In some cases, the excess samples may divide evenly between the available OFDM symbols, so that there is only one subset which is equal to the full union. In other embodiments, the excess samples may be distributed to two or more subsets of OFDM symbols.

As previously described, at least one of the number of excess samples and an index of the OFDM symbol is used to determine into which subset a particular OFDM symbol shall be placed. In some embodiments, only one of the two quantities is used.

In one example, for a particular subset, the cyclic prefixes of all of the OFDM symbols in that subset may be incremented by the same number. Different subsets may use different numbers.

At step 1835, a transmitter of the base station may transmit the frame over a wireless channel.

In some embodiments, the action of constructing the frame may also include, for one of the at least one subset of the union, setting the unique number for that subset to zero.

In some embodiments, one of the at least one subset of the union represents an initial contiguous subset of the OFDM symbols in the union.

In some embodiments, the at least one subset of the union and the unique number for each of the at least one subset of the union are determined according to an algorithm known to remote devices that receive said transmissions.

A remote device uses knowledge of the subset along with other information, such as the frame start, the length of the preamble in symbols, the start of the payload region, the configured FFT sizes and cyclic prefix lengths, and PFDCH length, to determine exactly the group of samples in the received frame that corresponds to each OFDM symbol in its assigned partition and assigned service data stream or streams.

In one set of embodiments, a method for constructing and transmitting a frame having a specified temporal length may be implemented as follows. It should be appreciated that the method may enable flexibility in configuring transmissions from a base station. The method may include performing operations using digital circuitry of the base station, wherein said operations include: (a) computing a sum of sample lengths of OFDM symbols assigned to a payload region of a frame; (b) computing a number of excess samples based on the sum and a sample length of the payload region; and (c) constructing the frame, where the action of constructing the frame includes distributing the excess samples to one or more cyclic prefixes of one or more of the OFDM symbols assigned to the frame. The frame may be transmitted onto a wireless channel using a transmitter of the base station.

Figure 19:
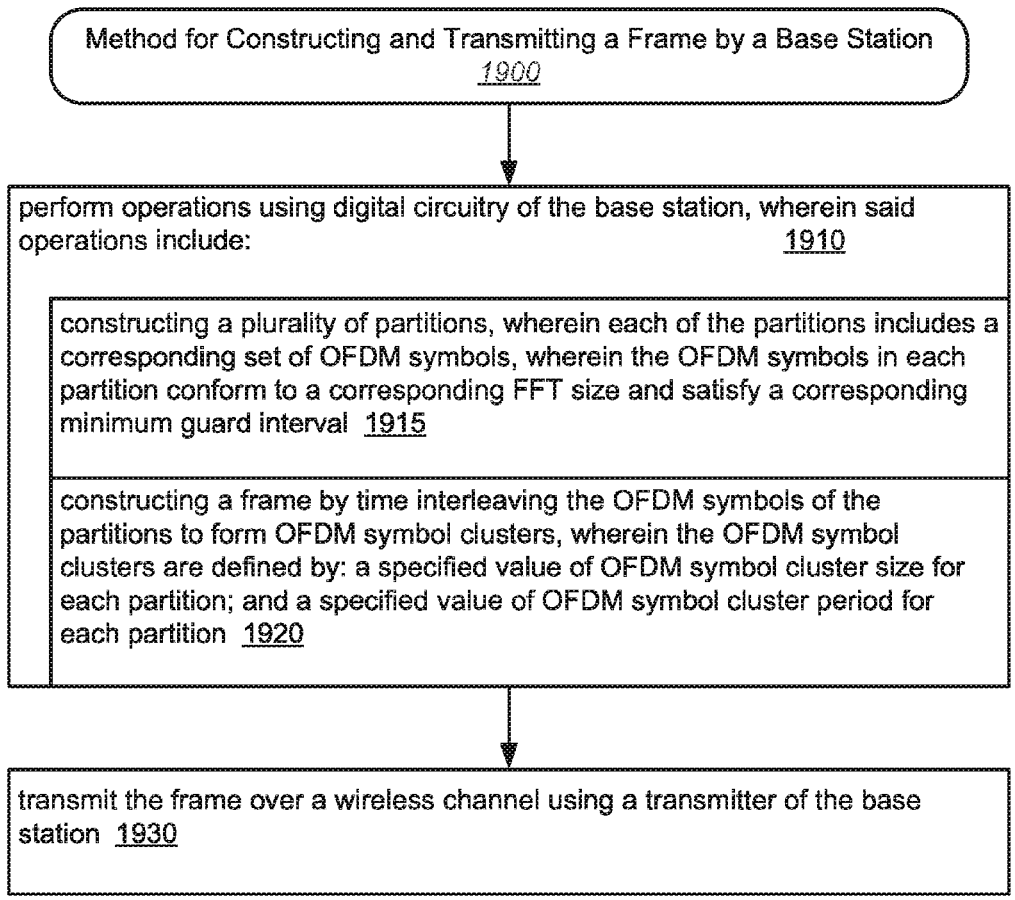
FIG. 19 illustrates one embodiment of a method for constructing and transmitting a frame by a base station, where the frame includes a plurality of partitions, each having a corresponding FFT size and a corresponding cyclic prefix size, wherein the partitions are time interleaved.

In one set of embodiments, a method 1900 for constructing and transmitting a frame may include the actions shown in FIG. 19. The method 1900 may also include any subset of the features, elements and embodiments previously described. The method 1900 may be implemented by a base station or access point, for example.

At step 1910, digital circuitry of the base station may perform operations, wherein the operations include 1915 and 1920, as follows.

At step 1915, the digital circuitry may construct a plurality of partitions, wherein each of the partitions includes a corresponding set of OFDM symbols, wherein the OFDM symbols in each partition conform to a corresponding FFT size and satisfy a corresponding minimum guard interval. In other words, for each partition, each OFDM symbol in that partition has a cyclic prefix that is greater than or equal to the minimum guard interval for that partition and has an FFT size equal to the FFT size of that partition.

At step 1920, the digital circuitry may construct a frame by time interleaving the OFDM symbols of the partitions to form OFDM symbol clusters, as variously described above. Each of the OFDM symbol clusters belongs to a corresponding one of the partitions. The OFDM symbol clusters may be defined by a specified value of OFDM symbol cluster size for each partition, and a specified value of OFDM symbol cluster period for each partition.

At step 1930, a transmitter of the base station may transmit the frame over a wireless channel.

In some embodiments, a first of the partitions may be targeted for transmission to mobile devices, while a second of the partitions is targeted for transmission to fixed devices. Thus, the FFT size corresponding to the first partition is configured to be smaller than the FFT size corresponding to the second partition.

In some embodiments, the above-described operations also include embedding signaling information in the frame, wherein the signaling information indicates the specified value of OFDM symbol cluster size for each partition and the specified value of OFDM symbol cluster period for each partition. A user device may be configured to receive the frame, and recover the signaling information from the frame. For a particular partition to which the user device has been assigned, the user device determines the corresponding specified values of OFDM symbol cluster size and OFDM symbol cluster period based on the signaling information in the frame. The user device may then recover the OFDM symbols belonging to the OFDM symbol clusters of the particular partition, using the corresponding specified values.

Figure 20:
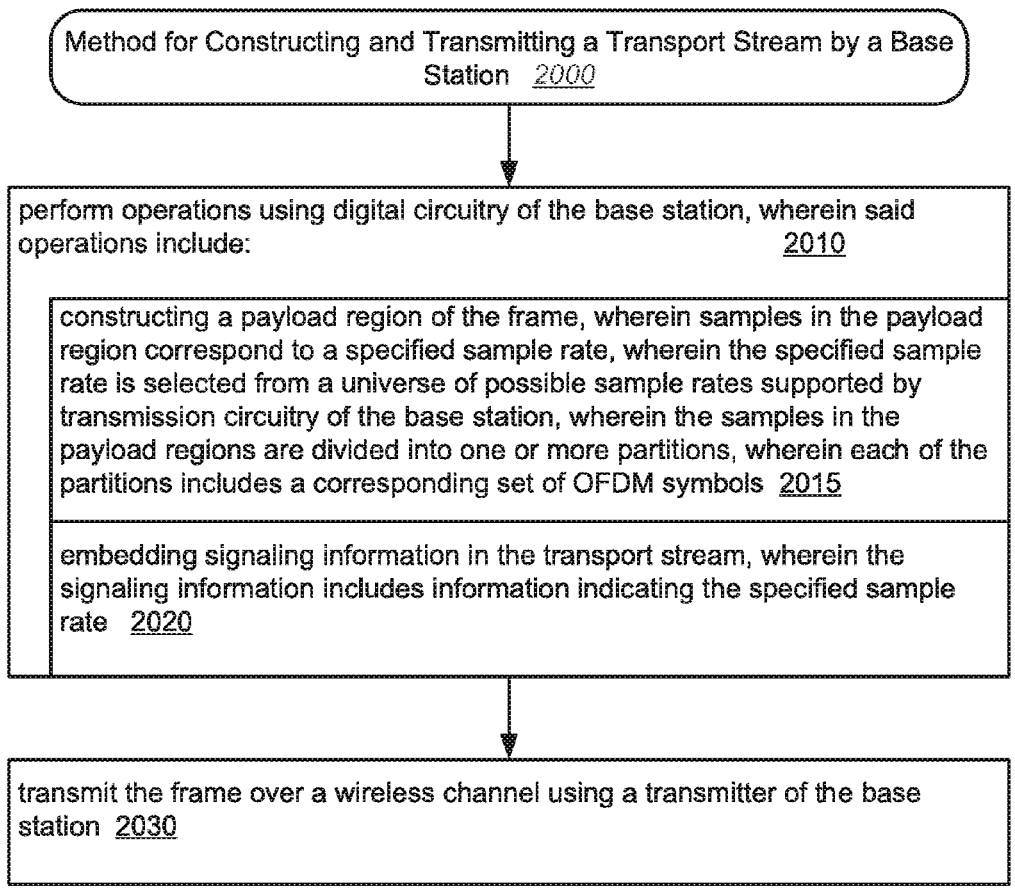
FIG. 20 illustrates one embodiment of a method for constructing and transmitting a frame by a base station, wherein the sample rate associated with payload regions of the frame is configurable.

In one set of embodiments, a method 2000 for constructing and transmitting a transport stream may include the actions shown in FIG. 20, where the transport stream includes a frame. The method 2000 may also include any subset of the features, elements and embodiments previously described above. The method 2000 may be implemented by a base station or access point, for example.

At step 2010, digital circuitry of the base station may perform operations, wherein the operations include 2015 and 2020, as follows.

At 2015, the digital circuitry may construct a payload region of the frame, wherein samples in the payload region correspond to a specified sample rate, wherein the specified sample rate is selected from a universe of possible sample rates supported by transmission circuitry of the base station, wherein the samples in the payload regions are divided into one or more partitions, wherein each of the partitions includes a corresponding set of OFDM symbols.

At step 2020, the digital circuitry may embed signaling information in the transport stream, wherein the signaling information includes information indicating the specified sample rate.

At step 2030, a transmitter of the base station may transmit the transport stream over a wireless channel.

In some embodiments, the sample rate has been specified by an operator of a broadcast network that includes said base station. The operator may specify the sample rate, for example, by accessing the broadcast gateway 102 illustrated in FIG. 1A.

In some embodiments, the signaling information is embedded in a non-payload region of the frame.

In some embodiments, each partition has a corresponding value of FFT size for OFDM symbols included in that partition.

In some embodiments, for each partition, the FFT size for the partition and the sampling rate have been selected to define a subcarrier spacing for the partition that satisfies a specified minimum subcarrier spacing or Doppler tolerance for that partition.

A given user device may wirelessly receive the transport stream, including the frame and the signalling information. The user device may configure its OFDM receiver and/or analog-to-digital conversion circuitry to use the sample rate specified by the signaling information in order to capture samples of the payload region of the frame. The user device may then decode an appropriate partition and service data stream or streams of the frame as variously described.

Contrasts with DVB

Digital Video Broadcasting ("DVB") and Second Generation Terrestrial DVB-T2 includes a Future Extension Frame ("FEF") as the mechanism to enable a mixed Super Frame ("SF") structure. According to DVB, the mixed Super Frame permits with the same network to transmit in the same frequency band both fixed and mobile TV services each with an optimized waveform such as time segmented transmission of T2 and FEF frames.

To preserve backward compatibility, DVB-T2 imposes several constraints to allow the introduction of FEFs. For example, according to DVB-T2, the ratio of T2 frames to FEFs is fixed and is repeated inside a SF. In addition, an SF must start with a T2-frame and should end with a FEF. Also, it is not possible to have 2 consecutive FEFs according to DVB-T2.

The present disclosure imposes no such constraints. In particular, the ratio of transport resources allocated between FFT modes and respective partitions is determined statistically based on the respective configuration in each mode, including FFT size, CP duration, and payload extent in symbols. In addition, there are no restrictions on the FFT mode inserted at either the start or end of a frame. Also, the FFT modes will repeat in succession as needed to satisfy the statistical multiplexing arrangement.

One significant difference between the present disclosure and DVB-T2 lies in the manner in which FFT modes are multiplexed. DVB-T2 with FEF operates on the basis of frames distributed over the duration of a SF. Services are essentially multiplexed in time on individual frame boundaries separated by P1 preambles. The present disclosure, on the other hand, describes a scheduling arrangement that permits services to be multiplexed on OFDM symbol boundaries within the same frame, providing substantial added flexibility. More than two modes can be multiplexed in the same transport, providing multiple levels of mobility vs. throughput efficiency. Time multiplexing on symbol boundaries increases the extent of either mode, maximizing time diversity. The frame configuration is signaled to the receiver, indicating the periodicity of each FFT mode and the symbols needed to recover the payload associated with either service.

The present disclosure further permits the option to separate partitions in the frequency domain, thereby confining each partition to separate sets of subcarriers. This is a capability not readily addressable within DVB.

Efforts to merge different FFT modes within a single DVB frame would require a change in the preamble structure, undermining backward compatibility with legacy receivers. Given the manner in which frames are multiplexed in DVB, confined to separate P1 preamble regions, there is no gain in time diversity. Restrictions imposed on the ratio of T2 to FE frames limits the usefulness of this DVB multiplexing arrangement to a limited set of hand-crafted use case scenarios.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
generating a first set of orthogonal frequency domain multiplexing (OFDM) symbols for a first set of user devices having a first set of delay spreads using a first transform size and a first cyclic prefix size;

generating a second set of OFDM symbols for a second set of user devices having a second set of delay spreads different from the first set of delay spreads using a second transform size and a second cyclic prefix size, wherein the second cyclic prefix size is different than the first cyclic prefix size;

generating a data frame including a non-payload region and a payload region, wherein the payload region comprises the first set of OFDM symbols and the second set of OFDM symbols; and broadcasting the data frame.

2. The method of claim 1, wherein the generating the data frame comprises generating the non-payload region comprising signaling information associated with the payload region of the data frame.

3. The method of claim 2, wherein the generating the non-payload region comprises using the first transform size, the second transform size, the first cyclic prefix size, and the second cyclic prefix size as the signaling information.

4. The method of claim 1, wherein the generating the first set of OFDM symbols comprises using the first cyclic prefix size of 24, 48, 96, 192, 384, 768, 1536, 3072, or 6144 samples and wherein the second set of delay spreads have smaller values than the first set of delay spreads.

5. The method of claim 4, wherein the generating the second set of OFDM symbols comprises using the second cyclic prefix size that is smaller than the first cyclic prefix size.

6. The method of claim 1, further comprising:
determining the first cyclic prefix size based on a first minimum guard interval duration; and
determining the second cyclic prefix size based on a second minimum guard interval duration.

7. The method of claim 6, wherein:
the determining the first cyclic prefix size comprises determining the first cyclic prefix size to be greater than or equal to the first minimum guard interval duration, and
the determining the second cyclic prefix size comprises determining the second cyclic prefix size to be greater than or equal to the second minimum guard interval duration.

8. The method of claim 1, wherein the generating the data frame comprises time-interleaving the first set of OFDM symbols and the second set of OFDM symbols.

9. A base station, comprising:
a processor configured to:
generate a first set of orthogonal frequency domain multiplexing (OFDM) symbols for a first set of user devices having a first set of delay spreads using a first transform size and a first cyclic prefix size;
generate a second set of OFDM symbols for a second set of user devices having a second set of delay spreads different from the first set of delay spreads using a second transform size and a second cyclic prefix size, wherein the second cyclic prefix size is different than the first cyclic prefix size;
generate a data frame including a non-payload region and a payload region, wherein the payload region comprises the first set of OFDM symbols and the second set of OFDM symbols; and
a transmitter configured to broadcast the data frame.

10. The base station of claim 9, wherein the processor is further configured to generate the non-payload region of the data frame based on signaling information associated with the payload region of the data frame.

11. The base station of claim 10, wherein, to generate the non-payload region, the processor is configured to use the first transform size, the second transform size, the first cyclic prefix size, and the second cyclic prefix size as the signaling information.

12. The base station of claim 9, wherein to generate the first set of OFDM symbols the processor is configured to use the first cyclic prefix size of 24, 48, 96, 192, 384, 768, 1536, 3072, or 6144 samples and wherein the second set of delay spreads have smaller values than the first set of delay spreads.

13. The base station of claim 12, wherein the first cyclic prefix size is larger than the second cyclic prefix size.

14. The base station of claim 9, wherein the processor is further configured to:
determine the first cyclic prefix size based on a first minimum guard interval duration; and
determine the second cyclic prefix size based on a second minimum guard interval duration.

15. The base station of claim 14, wherein the processor is further configured to:
determine the first cyclic prefix size to be greater than or equal to the first minimum guard interval duration; and
determine the second cyclic prefix size to be greater than or equal to the second minimum guard interval duration.

16. The base station of claim 9, wherein, to generate the data frame, the processor is configured to time-interleave the first set of OFDM symbols and the second set of OFDM symbols.

17. A computer program product for transmitting a data frame, the computer program product comprising one or more non-transitory computer-readable storage devices having stored thereon computer executable instructions that when executed cause at least one processor to:
generate a first set of orthogonal frequency domain multiplexing (OFDM) symbols for a first set of user devices having a first set of delay spreads using a first transform size and a first cyclic prefix size;
generate a second set of OFDM symbols for a second set of user devices having a second set of delay spreads using a second transform size and a second cyclic prefix size, wherein the second cyclic prefix size is different than the first cyclic prefix size and the second set of delay spreads have smaller values than the first set of delay spreads;
generate a data frame including a non-payload region and a payload region, wherein the payload region comprises the first set of OFDM symbols and the second set of OFDM symbols; and
cause the data frame to be broadcast.

18. The computer program product of claim 17, wherein the computer executable instructions when executed cause the at least one processor to:
determine the first cyclic prefix size to be greater than or equal to a first minimum guard interval duration; and
determine the second cyclic prefix size to be greater than or equal to a second minimum guard interval duration.

19. The computer program product of claim 17, wherein to generate the first set of OFDM symbols, the computer executable instructions when executed cause the at least one processor to use the first cyclic prefix size of 24, 48, 96, 192, 384, 768, 1536, 3072, or 6144 samples.

20. The computer program product of claim 17, wherein to generate the second set of OFDM symbols, the computer executable instructions when executed cause the at least one processor to use the second cyclic prefix size that is smaller than the first cyclic prefix size.

\* \* \* \* \*